(12) United States Patent
Hosokawa et al.

(10) Patent No.: US 11,100,450 B2
(45) Date of Patent: Aug. 24, 2021

(54) DOCUMENT QUALITY INSPECTION

(71) Applicant: INTERNATIONAL BUSINESS MACHINES CORPORATION, Armonk, NY (US)

(72) Inventors: Nobuhiro Hosokawa, Tokyo (JP); Futoshi Iwama, Tokyo (JP); Satoshi Masuda, Tokyo (JP); Hiroaki Nakamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 15/055,110

(22) Filed: Feb. 26, 2016

(65) Prior Publication Data
US 2017/0249380 A1    Aug. 31, 2017

(51) Int. Cl.
*G06F 8/70* (2018.01)
*G06F 8/33* (2018.01)
*G06Q 10/06* (2012.01)

(52) U.S. Cl.
CPC ......... *G06Q 10/06395* (2013.01); *G06F 8/33* (2013.01); *G06F 8/70* (2013.01); *G06Q 10/06* (2013.01)

(58) Field of Classification Search
CPC .... G06F 17/27; G06F 17/271; G06F 17/2765; G06F 17/2705; G06F 17/30654; G06F 17/30637; G06F 8/33; G06F 10/06395
See application file for complete search history.

(56) References Cited

U.S. PATENT DOCUMENTS

| 7,689,431 B1 * | 3/2010 | Carmel | G06F 40/253 705/1.1 |
| 8,266,519 B2 | 9/2012 | Verma et al. | |
| 8,739,150 B2 * | 5/2014 | Gass | G06F 8/72 717/168 |
| 9,454,457 B1 * | 9/2016 | Jan | G06F 11/3684 |

(Continued)

OTHER PUBLICATIONS

C & C Tools, "Boxer," C & C tools. Retrieved on Jan. 2016. (pp. 1). Available at: http://svn.ask.it.usyd.edu.au/trac/candc/wiki/boxer.

(Continued)

*Primary Examiner* — Ashish Thomas
*Assistant Examiner* — Jedidiah P Ferrer
(74) *Attorney, Agent, or Firm* — Tutunjian & Bitetto, P.C.; Randall Bluestone

(57) ABSTRACT

Methods, computer systems, and computer program products are provided for generating one or more condition sets from one or more documents. The method includes recognizing one or more paragraphs in each document having one or more listing and nested paragraphs and generating one or more paragraph trees wherein each node in the paragraph tree corresponds to a paragraph text in the document. The method further includes extracting one or more conditions as a logical formula from each paragraph text comprising a condition expression; and obtaining one or more condition sets written by a set of logical formulas from the one or more extracted conditions, according to a set of child nodes belonging to each common parent node in each of the paragraph trees; generating one condition set used for quality inspection, for each of the one or more condition sets written by the set of logical formulas.

20 Claims, 13 Drawing Sheets

(56) References Cited

U.S. PATENT DOCUMENTS

| | | | |
|---|---|---|---|
| 9,875,098 B2* | 1/2018 | Mehalingam | G06F 8/74 |
| 2004/0230960 A1* | 11/2004 | Nair | G06F 8/433 |
| | | | 717/140 |
| 2005/0060317 A1* | 3/2005 | Lott | G06F 17/22 |
| | | | 707/999.001 |
| 2005/0125422 A1 | 6/2005 | Hirst | |
| 2006/0288285 A1 | 12/2006 | Lai et al. | |
| 2007/0174711 A1* | 7/2007 | Uehara | G06F 11/3672 |
| | | | 714/38.1 |
| 2010/0005386 A1* | 1/2010 | Verma | G06F 17/30011 |
| | | | 715/237 |
| 2011/0119655 A1* | 5/2011 | Matsuda | G06F 17/504 |
| | | | 717/126 |
| 2012/0110544 A1 | 5/2012 | Novak et al. | |
| 2012/0278107 A1* | 11/2012 | Cunningham | G06F 19/00 |
| | | | 705/4 |
| 2013/0091423 A1 | 4/2013 | Dautovic et al. | |
| 2013/0246436 A1* | 9/2013 | Levine | G06F 40/279 |
| | | | 707/741 |
| 2014/0282374 A1* | 9/2014 | Fletcher | G06F 8/43 |
| | | | 717/106 |
| 2015/0324547 A1* | 11/2015 | Graham | G06F 19/3456 |
| | | | 705/2 |
| 2016/0087929 A1* | 3/2016 | Vembu | G06F 21/6209 |
| | | | 709/206 |

OTHER PUBLICATIONS

Dautovic, A. et al., "Automatic Checking of Quality Best Practices in Software Development Documents," 11th International Conference on Quality Software, Jul. 2011. (pp. 208-217).

Masuda, S. et al., "Semantic Analysis Technique of Logics Retrieval for Software Testing from Specification Documents," IEEE Eighth International Conference on Software Testing, Verification and Validation Workshops (ICSTW), Apr. 2015. (pp. 1-6).

* cited by examiner

Description 1     201

```
2...
2.1. Check parameter
   (1) If the checking is NG,
       output error info into logs
   (2) if the checking is OK
       It gets the number of requests
       by interfacing EJB, write it on
       download information table.
```

Description 2     202

```
4. Check parameter
1. Check search-key
    · If the checking is NG, return error
2. If the checking is OK,
    It gets the number of requests
    by interfacing EJB, write it on
    download information table.
```

FIG. 2

Description 3     203

```
5. In the case of no parameter,
 perform D-search-key existing check
5.1. Error case :
    · if the checking is NG, then error
5.2. Normal case:
    · It gets the number of requests
       by interfacing EJB, write it on
       download information table.
```

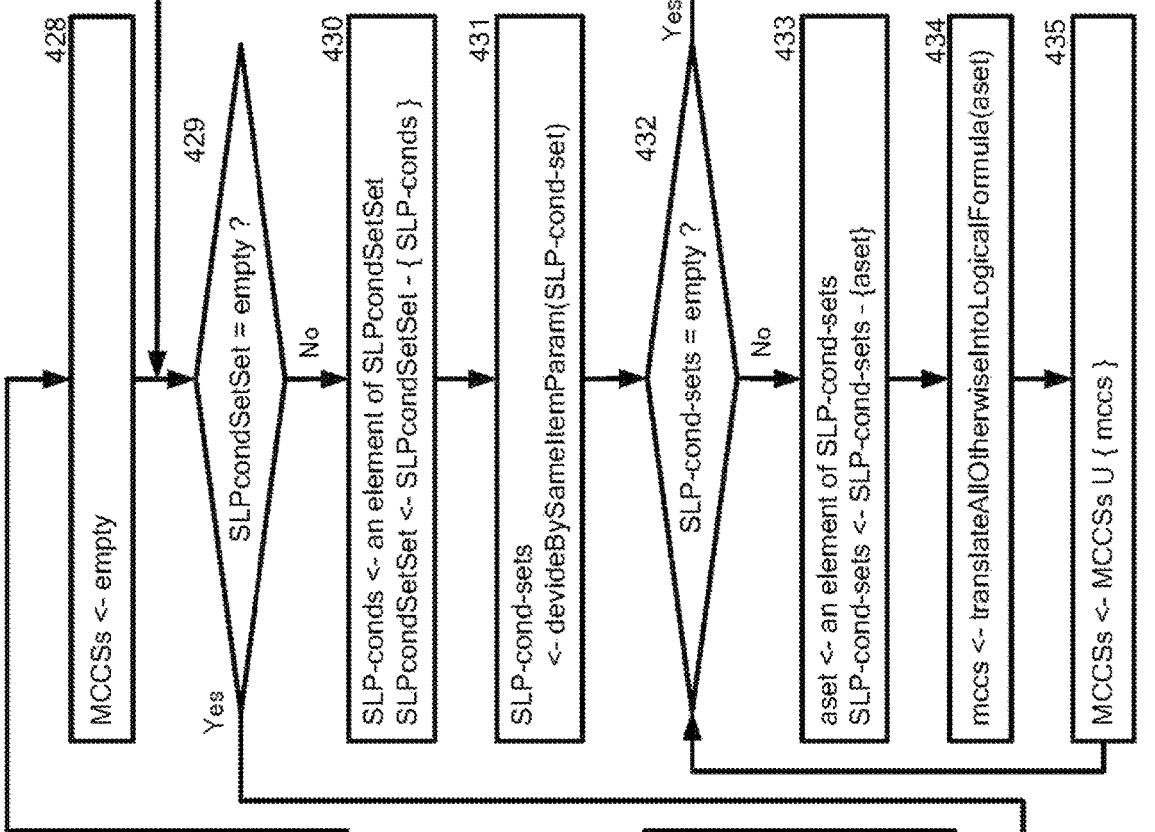
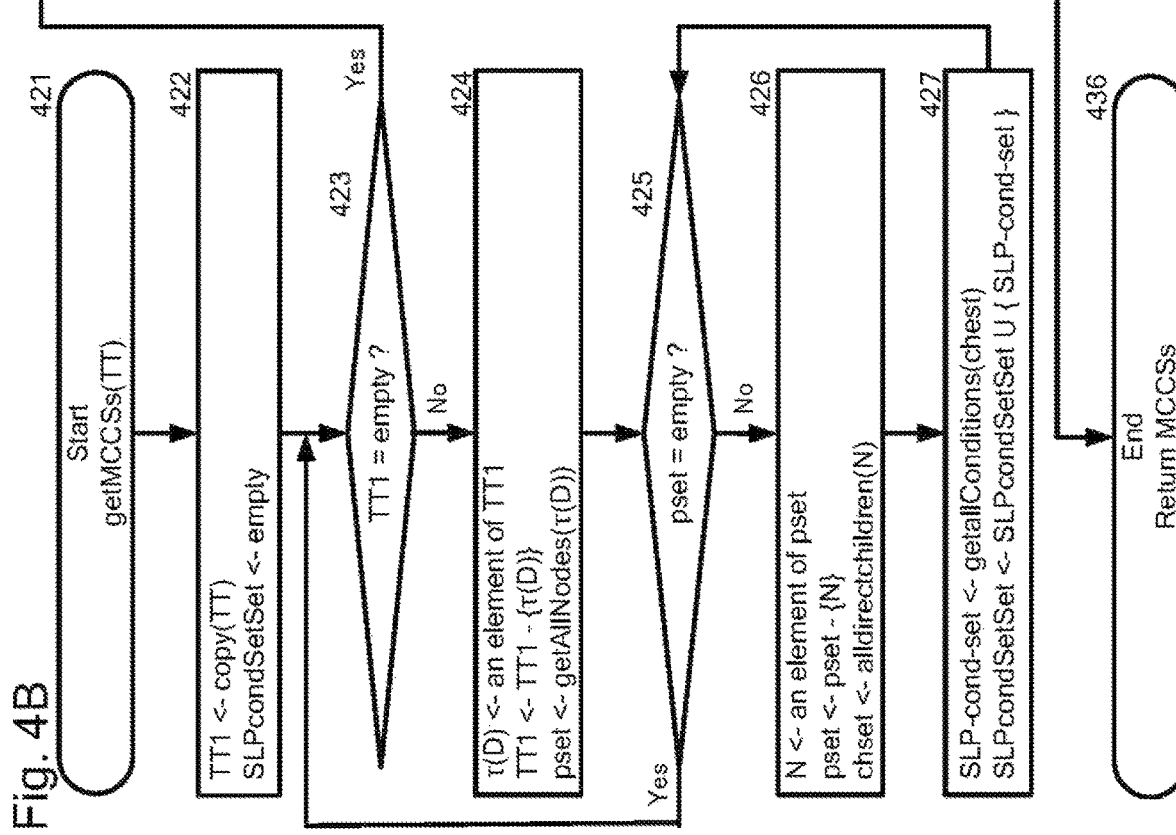
Fig. 4B

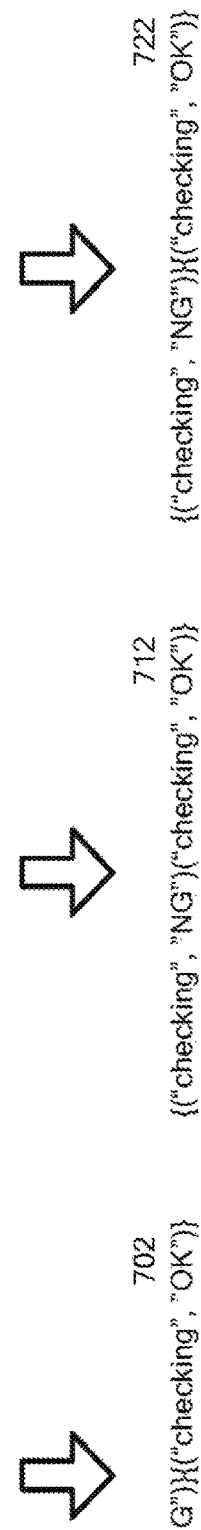

Document A 701
Function descriptions

The system gets a key of the print-out that has been requested from a screen, get data of the print-out, check the value of the print-out data, and send the checked OK data to print-out management table. The system calls on-demand batch program to print them out by interfacing System A
1. check the value of print-out data
(1) If the result of the checking is NG it rises an exception , and put error information to logs.
2. If the result of the checking is OK It gets the number of requests by interfacing System A, write it on download information working table.

*intentionally underlined*

⇒ 702

{("checking" , "NG")}{("checking", "OK")}

Document B 711
Function descriptions

1. The system gets a key of the print-out that has been requested from a screen, get data of the print-out, check the value of the print-out data, and send the checked OK data to print-out management table. The system calls on-demand batch program to print them out by interfacing System A
1.1 check the value of print-out data
(1) If the result of the checking is NG it rises an exception, and put error information to logs.
(2) If the result of the checking is OK It gets the number of requests by interfacing System A, write it on download information working table.

*intentionally underlined*

⇒ 712

{("checking", "NG")("checking", "OK")}

Document C 721
Function descriptions

1. The system gets a key of the print-out that has been requested from a screen, get data of the print-out, check the value of the print-out data, and send the checked OK data to print-out management table. The system calls on-demand batch program to print them out by interfacing System A
* Perform print-out data checking
1.1 exceptional case
(1) If the result of the checking is NG it rises an exception, and put error information to logs.
1.2 normal case
(2) If the result of the checking is OK It gets the number of requests by System A, write it on download information working table.

*intentionally underlined*

⇒ 722

{("checking", "NG")}{("checking", "OK")}

Fig. 7A

DOCUMENT QUALITY INSPECTION

BACKGROUND

The present principles relate to document quality inspection and, more specifically, to a technique for generating condition sets used for document quality inspection and for performing quality inspection using the condition sets.

Document quality inspection is an important task in reviewing the quality of a document relating to, for example, an existing or developing system from several different views in software development projects. However, such inspection usually tends to be a costly task, because the inspection is usually a highly labor-based task requiring quality-expert persons. A lot of document-artifacts are usually created in the projects. Accordingly, an inspection support system potentially dramatically reduces inspection-costs, such as labor-costs, and time.

SUMMARY

According to one aspect of the present principles, an embodiment of the present principles provides a computer-implemented method for generating one or more condition sets from one or more documents. The method comprises recognizing one or more paragraphs in each document having one or more listing and nested paragraphs and generating one or more paragraph trees, wherein each node in the paragraph tree corresponds to a paragraph text in the document and each edge in the paragraph tree corresponds to parent-child relation between the paragraphs in the document; extracting one or more conditions as a logical formula from each paragraph text comprising a condition expression; obtaining one or more condition sets written by a set of logical formulas from the one or more extracted conditions, according to a set of child nodes belonging to each common parent node in each of the paragraph trees; generating one condition set used for quality inspection, for each of the one or more condition sets written by the set of logical formulas.

According to another aspect of the present principles, a system comprising a computer readable storage medium storing a program of instructions executable by the computer system to perform one or more methods described herein may be provided.

According to another aspect of the present principles, a computer program product comprising a computer readable storage medium storing a program of instructions executable by the computer system to perform one or more methods described herein also may be provided.

BRIEF DESCRIPTION OF THE DRAWINGS

FIG. 2 illustrates examples of description having one or more listing and nested paragraphs form in a document according to an embodiment of the present principles.

FIG. 4B illustrates an embodiment of a flowchart of a process for generating Must-Cover-Condition Sets (MCCSs) from each paragraph graph according to the present principles.

FIG. 7A illustrates an embodiment of performing quality inspection on documents, according to an embodiment of the present principles.

DETAILED DESCRIPTION

The descriptions of the various embodiments of the present principles have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
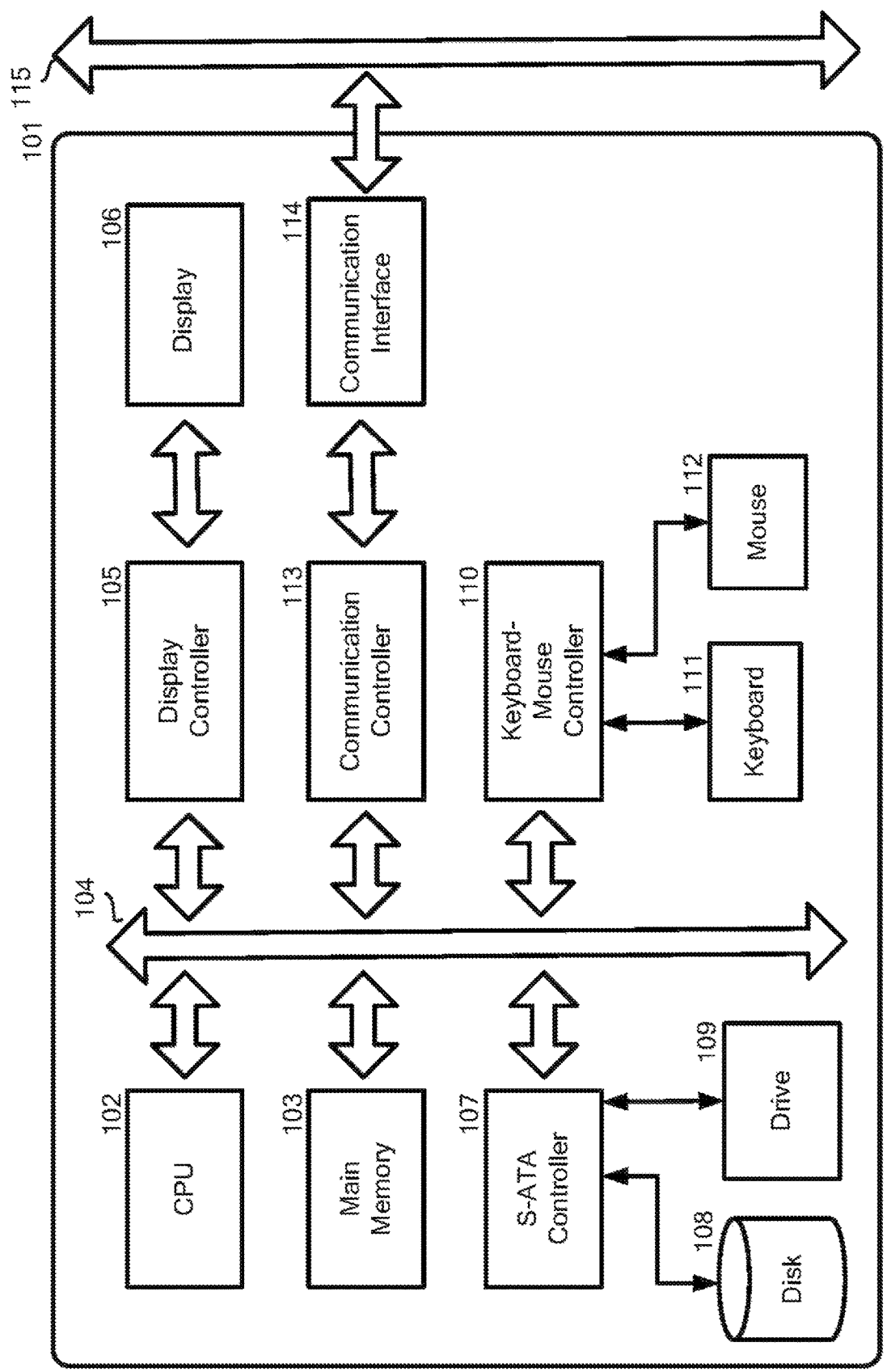
FIG. 1 illustrates an exemplified basic block diagram of a computer hardware used according to an embodiment of the present principles.

With reference now to FIG. 1, FIG. 1 illustrates an exemplified basic block diagram of a computer hardware used in an embodiment of the present principles.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a Liquid Crystal Display (LCD), may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® Virtual Machine (VM), and a Java® Just-In-Time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present principles, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Prior to explaining an embodiment of the present principles, examples of "listing and nested paragraphs" used in the embodiment of the present principles will be explained first below.

With reference now to FIG. 2, FIG. 2 illustrates examples of description having one or more listing and nested paragraphs form in a document.

Let us suppose that the document has Descriptions 1 to 3 (201, 202 and 203, respectively). Each of Descriptions 1 to 3 (201, 202 and 203) has listing and nested paragraphs. The listing and nested paragraphs may have multi-level paragraph listing in the form of a nested structure. Thus, the listing and nested paragraphs may have a parent paragraph in each paragraph; each parent paragraph may have a list of one or more children paragraphs; and the same may apply also to the children paragraphs. The listing and nested paragraphs are used in a document, for example, but not limited to text documents; or spreadsheet or calc documents.

One of the most important inspection-views for documents such as software-related documents is whether or not all conditions for each process or function in system description, or input process output (IPO), are described in a uniform manner and in an exhaustively way. This is because omission or notation fluctuation of the conditions is directly connected to problems in a later implementation phase.

Some examples of the appropriate and inappropriate descriptions of the conditions in the document are explained using descriptions 1 to 3 (201, 202 and 203, respectively).

In Description 1 (201), Paragraph "2.1.," as a parent-level paragraph, has two sub-paragraphs "(1)" and "(2)" as child-level paragraphs having the same-rank level. Paragraph "2.1." describes a process, "check parameter". The sub-paragraph "(1)" describes one element in the condition set for the process, {"checking" and "OK"}. The sub-paragraph "(2)" describes another element in the condition set, {"checking" and "NG"}. Accordingly, the sub-paragraphs "(1)" and (2), which is the child paragraphs of the parent-level paragraph are in the same-rank level, cover the condition set of "{"checking" and "OK"} and {"checking" and "NG"}. Accordingly, it is concluded that the condition set is described appropriately in Description 1 (201).

In Description 1 (202), Paragraph "4.," as a parent-level paragraph, has two sub-paragraphs "1." and "2." as child-level paragraphs having the same-rank level. The Paragraph "4." Describes a process, "check parameter". The sub-paragraph "1." does not describe any condition set for the process but has a lower sub-paragraph as a grandchild paragraph "•" in which one element in the condition set, {"checking" and "NG"}, is described. The sub-paragraph "2." describes another element in the condition set, {"checking" and "OK"}. Accordingly, the sub-paragraphs "1." and "2" having the same-rank level do not cover the condition set of "{"checking" and "NG"} and {"checking" and "OK"}, but the different-rank level sub-paragraphs "•" and "2" cover the condition set of "{"checking" and "NG"} and {"checking" and "OK"}. Accordingly, it is concluded that the condition set is described inappropriately in Description 2 (202). Further, it is concluded that the improper sub-paragraphs is used in Description 2 (202). Further, it is apparent that the numerals used in the sub-paragraphs are inappropriate in view of the numeral used in the parent-level paragraph.

In Description 3 (203), Paragraph "5.," as a parent-level paragraph, has the two sub-paragraphs "5.1." and "5.2." as child paragraphs having the same-rank level. The Paragraph "5." Describes a process, "D-search-key existing check". The sub-paragraph "5.1." does not describes any condition set for the process but has a lower sub-paragraph "•" in which one element in the condition set, {"checking" and "NG"}, is described. The sub-paragraph "5.2." does not describe another element in the condition set, such as {"checking" and "OK"}, and has a lower sub-paragraph as a grandchild paragraph. The lower sub-paragraph does not also describe another element in the condition set, such as {"checking" and "OK"}. Thus, another element in the condition set is neither described in the sub-paragraph nor its lower sub-paragraph. Accordingly, it is concluded that the condition set is inappropriately described in Description 3 (203).

In one embodiment of the present principles, the functions of detecting suspicious condition-related low-quality parts of the descriptions are provided. In the suspicious condition-related low-quality parts, for example, the following situations will be found: the conditions may not be described exhaustively; some extra conditions may be mentioned; or some conditions may be described in different ways in different places in the same kind of documents.

Hereinafter, an embodiment of the present principles will be described with reference to FIG. 3, FIGS. 4A to 4D, FIGS. 5 and 6, FIGS. 7A and 7B, and FIGS. 8 and 9 mentioned below.

The idea of an embodiment of the present principles is on the basis of an assumption that if a condition set is described in child-paragraphs having the same-rank level, such condition set expresses related- (or may be exclusive) and independent- (or worth to be independently described) conditions with respect to one another. This means that if one element in the condition set is described, another or other elements in the condition set should be described in the description.

This can be reasonable and widely accepted assumption, because, in the usual listing and nested paragraphs usage, the low-level paragraphs describe detail information of the upper-level paragraph and paragraphs having the same-rank level describe independent (but may be similar or related with each other) information.

Also, in our inspection experiences for system descriptions in listing and nested paragraphs form written in any language such as English and Japanese, each exclusive condition often has been found to be described separately in the same-rank level child-paragraphs of a parent paragraph describing a process or function, and conversely, conditions described in the same-rank level child paragraphs of a parent paragraph have been almost certainly express related- (and exclusive-) conditions in the listing and nested paragraphs form.

Figure 3:
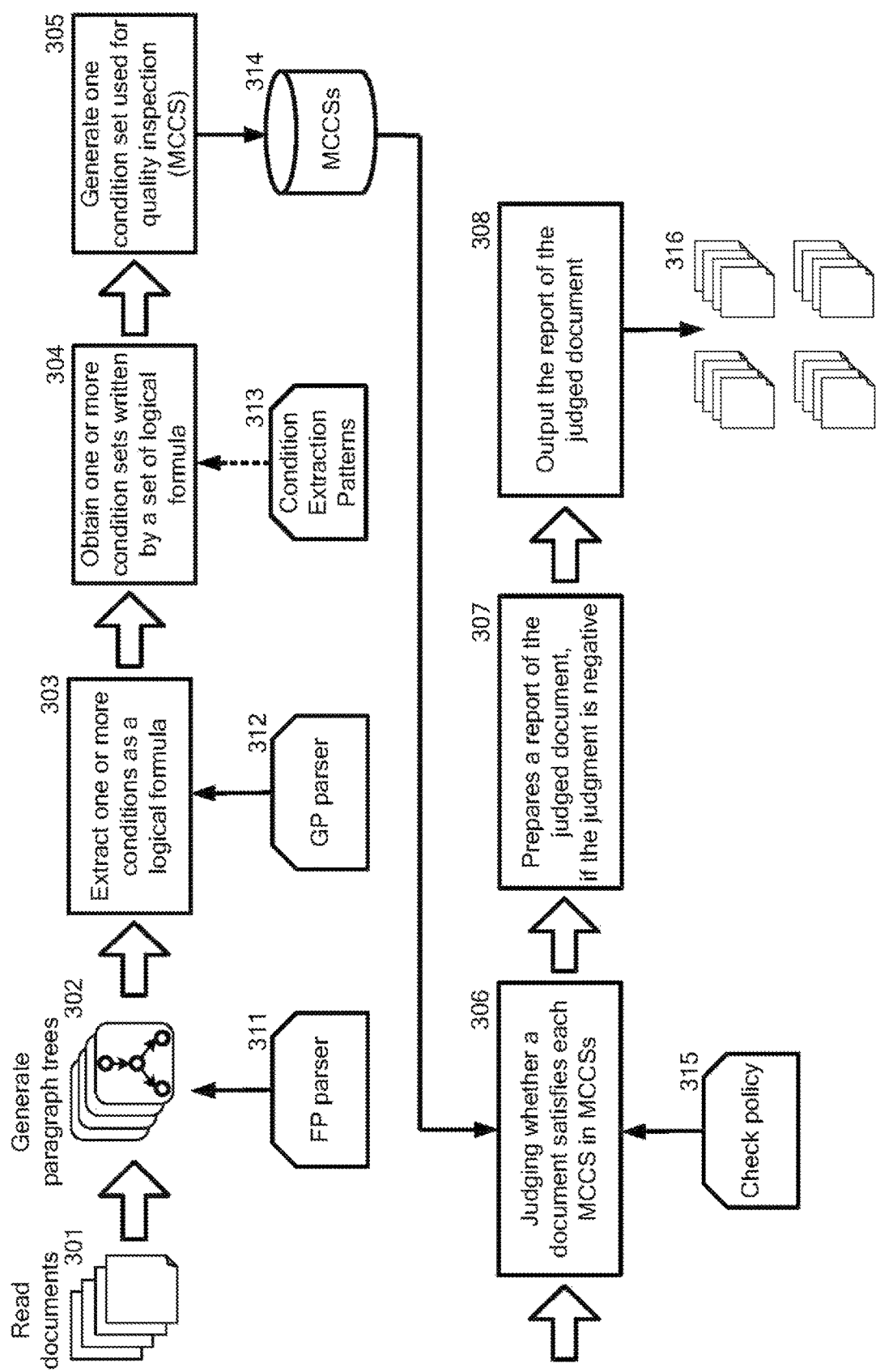
FIG. 3 illustrates an embodiment of an overall diagram for briefly explaining a process for generating one or more condition sets from one or more documents and performing quality inspection on one or more documents, using the one or more condition sets according to the present principles.

With reference now to FIG. 3, FIG. 3 illustrates an embodiment of an overall diagram for briefly explaining a process for generating one or more condition sets from one or more documents and performing quality inspection on one or more documents, using the one or more condition sets.

A system such as the computer (101) performs the steps described in FIG. 3. The system may be implemented as a single computer or plural computers.

The process basically is divided in two parts: one is for generating one or more conditions sets from one or more documents (see steps 301 to 305): and another is for performing quality inspection on one or more documents, using the generated conditions sets (see steps 306 and 307).

In step 301, the system reads one or more documents from a storage, such as drive (109) or from a network storage. The document may have one or more listing and nested paragraphs. The paragraph may have one or more paragraph texts each of which comprises one or more condition expressions. The document may have descriptions relating to, for example but not limited to, an existing or developing system.

In step 302, the system reads one document and then recognizes one or more paragraphs in the document, using a text-parser (311), such as FP parser, which can be used for recognizing a paragraph tree for each document. Any text-parser known in the art, such as FP parser, can be used for recognizing paragraphs.

The system associates each logical formula with a node in the paragraph tree to generate one or more paragraph trees from the recognized paragraphs. In the paragraph tree, each node in the paragraph tree corresponds to a paragraph text in the document, namely, the node corresponds to a paragraph text from which the logical formula was extracted. Each edge in the paragraph tree corresponds to parent-child relation between the paragraphs in the document. Any method known in the art can be used for generating the one or more paragraph trees.

In step 303, the system extracts, from each paragraph text, one or more conditions as a logical formula, using a text-parser (312), such as GP parser, which can be used for extracting one or more conditions as a logical formula from each paragraph text in the paragraph tree. Any text-parser known in the art can be used for extracting the conditions. The GP parsers may be implemented as the same or different of the FP parsers. Any text-parser known in the art, such as GP parser, can be used for extracting one or more conditions from each paragraph text. The text-parser may be, for example, but not limited to, Boxer for English, and STREET-JP for Japanese. Also, such text-parser can be manually constructed by finding, based on observation of the one or more documents, a pattern from a part where a condition is described, extracting a condition from the found pattern and, then, combining the condition.

The logical formula can be expressed, for example, as a form of (A, C). The form (A, C) means that an item or parameter A has a value of C or satisfies constraint C. The followings are listed as an example of the logical formula: if A has C then . . . ", "if A is C then . . . ", and "if C set to A then . . . ".

Further, if the form of (A, C) is expressed as (_, C), (_, C) means a condition saying the condition C itself holds or the constraint C is satisfied. The followings are listed as an example of the logical formula: "In the case of C", and "If C then . . . ,".

When a paragraph tree for each document D is expressed as T(D), each node in the T(D) contains a text of each paragraph in the document D and each edge in the T(D) expresses super/sub-relation on the paragraph in the document D.

The system extracts conditions as a logical formula, where primitive expression is of the form of (A, C), using the text-parser for text of each node of T(D) and then annotates the logical formula with the node to obtain a paragraph tree annotated with a condition set, τ(D). Hereinafter, the paragraph tree annotated with a condition set is referred to as condition set-annotated paragraph tree. Accordingly, the condition set-annotated paragraph tree, τ(D), for each document D is obtained.

In step 304, the system obtains a set of paragraph nodes of each paragraph for all paragraphs of all documents. Further, the system obtains one or more condition sets written by a set of logical formulas from the one or more extracted conditions, according to a set of child nodes belonging to each common parent node in each of the paragraph trees.

The system obtains a set of child nodes belonging to a common parent node in the paragraph tree in which each logical formula is associated with a node and then gathers logical formula associated with each of the child nodes in each set of the child nodes to obtain the aforementioned one or more condition sets written by a set of logical formulas.

Hereinafter, the set of child nodes belonging to a common parent node is also referred to as same-level-paragraph condition-set (SLP-cond-set).

When a set of paragraphs, $\tau(D)$, are used, the system obtains, from the set of paragraphs, $\tau(D)$, one or more condition sets written by a set of logical formulas.

The system may use condition extraction patterns (313) to extract the one or more conditions. The condition extraction patterns (313) define a specific tree pattern and are used for extracting conditions that should be considered at the same time.

In step 305, the system generates one condition set used for quality inspection, for each of the one or more condition sets written by the set of logical formulas. The condition set used for quality inspection is the condition set which must be covered in a target document for quality inspection, which the document set is named as "must-cover-condition set" (MCCS).

The system generates MCCS, according to the following step (a) or steps (a) and (b).

Step (a): The system divides one or more elements in each condition set (a first condition set) written by a set of logical formulas into elements having a common item or parameter and other elements.

For example, each set of logical formulas mentioned below are divided into elements having a common item or parameter and other elements.

The set of logical formulas, $\{(A,a1),(A,a2),(\_,c1),(\_,c2)\}$, is divided into two parts, $\{(A,a1),(A,a2)\}, \{(\_,c1),(\_,c2)\}$. In this example, the division is carried out according to the common item "A" and "_".

The set of logical formulas, $\{(A,a1) \wedge (B,b1), (B,b2), (\_,c1)\}$, is divided into two parts, $\{(A,a1) \wedge B,b1),(B,b2)\}, \{(\_,c1)\}$. In this example, the division is carried out according to the common item "B".

When the step (a) is only carried out, a result set obtained in the step (a), namely the second condition set as MCCS, is stored into a storage (314) and can be used for performing quality inspection of a document, according to one of the present principles.

When both of the steps (a) and (b) are carried out, a result of step (a), namely the second condition set, is used in the step (b).

Step (b): The system translates a specific keyword which is an element in the second condition set obtained in the step (a) into a form of a logical formula.

For example, the second condition set, $\{(time, 9:00{\sim}15:00), (time, otherwise\}$, is converted to $\{(time, 9:00{\sim}15:00), (time, not(9:00{\sim}15:00))\}$ by translating a keyword, "otherwise" as "not(9:00~15:00)". The keyword which will be translated is registered in advance, because the keyword may be assumed by the observation of the one or more documents.

When both of the steps (a) and (b) are carried out, a result set obtained in the step (b), namely a third condition set as MCCS, is stored into a storage (314) and can be used for performing quality inspection of a document, according to one of the present principles.

The followings are other examples of MCCSs. Each MCCS represents exhaustive condition sets in which (A, C) can take.

$\{$(PriceDB.cost, less500K\$), (PriceDB.cost, not(less500K\$)$\}$ $\{$(PriceDB.cost, less100K\$), (PriceDB.cost, over300K\$), (PriceDB.cost, not(less100K\$) $\wedge$ not(over300K\$))$\}$ $\{$(PriceDB.cost, less100K\$), (PriceDB.cost, not(less100K\$))$\}$ In step 306, the system reads one or more condition sets used for quality inspection, namely the MCCSs, from the storage (314) and judges whether a document in the one or more documents satisfies any one of the MCCSs or not.

The judgment may be performed by judging whether the paragraph tree in which each logical formula is associated with a node satisfies at least one of the one or more condition sets used for quality inspection.

In one embodiment, the judgment may be performed by judging whether the paragraph tree in which each logical formula is associated with a node has a node with which a logical formula corresponding to one condition comprised in one condition set used for quality inspection is associated; if the judgment is positive, searching for a parent node of the node with which a logical formula corresponding to the one condition is associated, using a check policy (315); and if the parent node is found, judging whether the parent node has child nodes with which each logical formula corresponding to each of the remaining one or more conditions comprised in the condition set which comprises the one condition is associated or not.

If the paragraph tree in which each logical formula is associated with a node does not have a child node with which a logical formula corresponding to one condition comprised in the one or more condition sets used for quality inspection is associated, a conclusion is made that the judged document does not satisfy the one or more condition sets used for quality inspection.

If the paragraph tree in which each logical formula is associated with a node does not have a child node with which a logical formula corresponding to one condition comprised in the one or more condition sets used for quality inspection is associated, a conclusion is made that the judged document does not satisfy the one or more condition sets used for quality inspection.

If the parent node have all child nodes with which each logical formula corresponding to each of the remaining one or more conditions comprised in the condition set which comprises the one condition is associated, a conclusion is made that the judged document satisfies the one or more condition sets used for quality inspection.

An exemplified embodiment of the judgment will be explained below.

The condition set-annotated paragraph tree, $\tau(D)$, obtained in step (b) was used to create a C(nd) for a set of conditions annotated to each node nd of $\tau(D)$.

For MCCS M$\in$MCCSs and each $\tau(D)$, the system judges whether $\tau(D)$ satisfies MCCS M under the check-policy (315), using the following procedure. The check policy (315) may be used to decide a search range in the condition set-annotated paragraph tree mentioned below and to specify a parent node as a base node from which a child node may be found. The check policy (315), cp, may be defined as, for example, but not limited to, cp=(cflag, reg) where cflag or condition flag refers to a Boolean flag and reg refers to a regular expression.

Here, M is set to M=$\{f1, \ldots, fn\}$. Further, fi (i=1, $\ldots$, n) is a propositional logical formula whose primitive formula is the form of (A, C).

Step 1. For each paragraph tree, $\tau(D)$, the system finds node nd such that f$\in$C(nd) and f implies fi by using, for example, the Depth-first search.

Step 1-1: If there exists no such node in $\tau(D)$, it is concluded that $\tau(D)$ does not satisfy M.

Step 1-2: If such node nd exists in $\tau(D)$:

Step 1-2-1: The system finds the base node of quality inspection, bnode, such that bnode is a parent node of node nd and bnode matches the check policy.

if such bnode does not exist, the system sets bnode to root node of $\tau(D)$. Here, bnode matches cp means cflag$\Rightarrow$ C(bnode)$\neq \varphi$ and reg matches text of bnode.

Step 1-2-2: The system finds xnode_i (i=1, ..., n) such that each xnode_i is a child node of bnode and there exists $x\_i \in C(xnode\_i)$ satisfying that x_i implies fi.

Step 1-2-2-1: if such xnode_1, ..., xnode_n exists, the system concludes that $\tau(D)$ satisfies M.

Step 1-2-2-2: if such xnode_1, ..., xnode_n does not exist, the system concludes that $\tau(D)$ does not satisfy M.

An embodiment of setting bnode will be explained in FIG. 5 below.

In step 306, the system concludes that the judged document does not have any inconsistent description if the judgment is positive. While the system concludes that the judged document has any inconsistent description, if the judgment is negative.

In step 306, the system obtains, for each MCCS M, IC (M) which is mapping from MCCS M to a set of documents whose condition set-annotated paragraph trees do not satisfy a MCCS M.

In step 307, the system prepares a report for the judged document, if the judgment is negative. The system may prepare a report of the description parts which fail to the judgment and the reasons of the failure, such as missing or extra conditions. These may be caused from notation fluctuations or bad paragraph-usage, but these themselves are right parts that may often cause problems in implementation phases and may be preferable to be reported by document quality inspection.

An exemplified embodiment of the preparation of the report will be explained below.

For each MCCS M$\in$MCCSs, the system carries out the following procedure.

The system calculates a set of documents DOC (M) such that DOC(M)=$\cup${IC(M')|M$\cap$M'$\neq\varphi$ and M'$\in$MCCSs}. Here, DOC(M) is the set of the documents which may be inconsistent with regard to the condition description and inclusiveness (for example, some condition may lack, some condition description may be described in different ways).

In step 308, the system outputs to a user the report (316) of documents DOC(M) or the detailed parts of the document in DOM(M).

FIGS. 4A to 4D illustrate a flowchart for implementing an embodiment of the present principles.

In an explanation of FIGS. 4A to 4D, the following abbreviations are used. "Docs": documents; "MCCS": a must-cover-condition set; "PT": a paragraph tree; "TT": a set of condition set-annotated paragraph tree, $\tau(D)$; "FP": a parser for recognizing a paragraph tree for each document; "GP": a parser for extracting, from each paragraph text, one or more conditions as a logical formula; and CP: check policy.

Figure 4A:
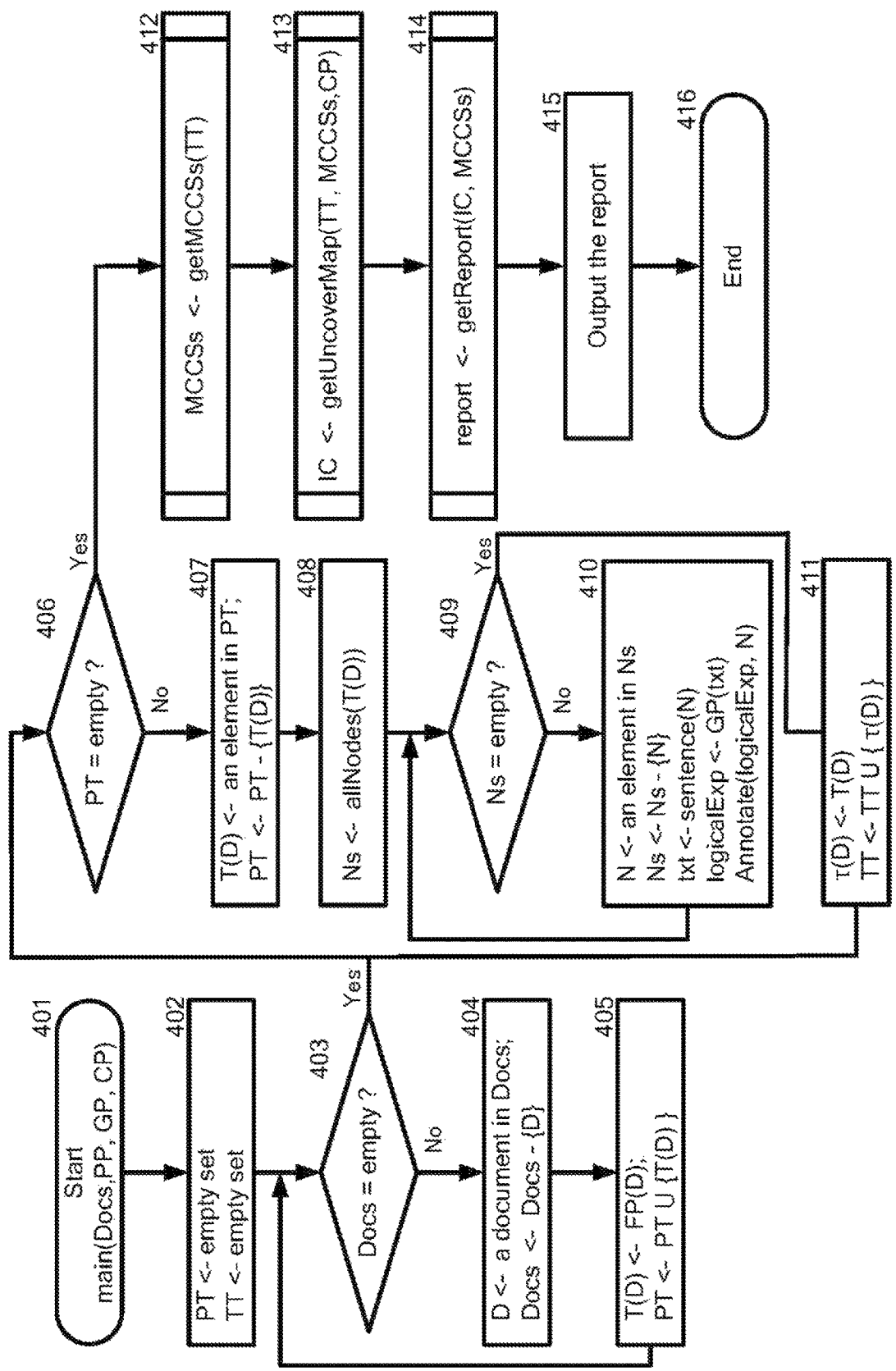
FIG. 4A illustrates an embodiment of an overall flowchart of a process for generating one or more condition sets from one or more documents and performing quality inspection on one or more documents, using the one or more condition sets according to the present principles.

With reference now to FIG. 4A, FIG. 4A illustrates an embodiment of an overall flowchart of a process for generating one or more condition sets from one or more documents and performing quality inspection on one or more documents, using the one or more condition sets.

In step 401, the system starts the process mentioned above. The system prepares main (Docs, PP, CP).

In step 402, the system assigns an empty set to PT in order to initialize PT. Further, the system assigns an empty set to TT in order to initialize TT.

In step 403, the system judges whether Docs is empty or not. If the judgment is negative, the system proceeds to step 404. If the judgment is positive, the system proceeds to step 406.

In step 404, the system obtains one document from Docs and then assigns the obtained document to D. Next, the system removes the obtained document from Docs, by using Docs−{D}, and then assigns Docs−{D} to Docs in order to update Docs.

In step 405, the system recognizes a paragraph tree, using the FP, from the obtained document and then assigns the recognized paragraph tree to T(D). Next, the system extracts each document D from Docs and then converts the document D into the paragraph tree. After then, the system collects a set of PT$\cup${T(D)} and then assigns the collected PT$\cup${T(D)} to PT. The system repeats the steps 403 to 405 for each document in Docs (namely, until Docs becomes empty).

In step 406, the system judges whether PT is empty or not. If the judgment is negative, the system proceeds to step 407. If the judgment is positive, the system proceeds to step 412.

In step 407, the system obtains one element (namely, a paragraph tree) in PT and then assigns the obtained PT to T(D). Next, the system removes the obtained element from PT, by using PT−{T(D)}, and then assigns PT−{T(D)} to PT in order to update PT.

In step 408, the system extracts all nodes in the paragraph tree and collects these extracted nodes in node set Ns.

In step 409, the system judges whether Ns is empty or not. If the judgment is negative, the system proceeds to step 410. If the judgment is positive, the system proceeds to step 411.

In step 410, the system obtains an element (namely, a node) N from Ns. Next, the system removes the obtained element from Ns by Ns−{N} and then assigns Ns−{N} to Ns. The system extracts one or more paragraph texts from the obtained element (N) and then assigns the obtained paragraph texts to txt. Next, the system extracts one or more conditions as a logical formula from the extracted paragraph texts and then assigns the extracted conditions to logicalExp. The system annotates the extracted conditions to the obtained node in the obtained paragraph tree. The system repeats the steps 409 and 410 for each element in Ns (namely, until Ns becomes empty).

In step 411, here, all nodes in T(D) are annotated with conditions which are extracted from the node. The system assigns the condition annotated paragraph tree, T(D), to $\tau(D)$. Next, the system collects $\tau(D)$ by TT<−TT$\cup${$\tau(U)$}, where TT is a set of $\tau(D)$s.

In step 412 which corresponds to the step 305 of FIG. 3, the system generates MCCSs from each paragraph graph. The detail of the step 412 will be explained using FIG. 4B.

In step 413 which corresponds to the step 306 of FIG. 3, the system judges whether a document in the one or more documents satisfies any one of the MCCSs or not. The detail of the step 413 will be explained using FIG. 4C.

In step 414 which corresponds to the step 307 of FIG. 3, the system prepares a report of the judged documents. The detail of the step 414 will be explained using FIG. 4D.

In step 415 which corresponds to the step 308 of FIG. 3, the system reports the judged document.

In step 416, the system terminates the process mentioned above.

With reference now to FIG. 4B, FIG. 4B illustrates an embodiment of a flowchart of a process for generating MCCSs from each paragraph graph.

In step 421, the system starts the process mentioned above. The system obtains TT generated in step 411, using getMCCSs(TT).

In step 422, the system copies TT to TT1. The system sets SLPcondSetSet to zero in order to initialize SLPcondSetSet. The SLPcondSetSet is used for storing the SLP-cond-set.

In step 423, the system judges whether TT1 is empty or not. If the judgment is negative, the system proceeds to step 424. If the judgment is positive, the system proceeds to step 428.

In step 424, the system obtains an element, namely τ(D), from TT1. Next, the system removes the obtained τ(D) from TT1 by TT1−{τ(D)} and then assigns TT1−{τ(D)} to TT1 in order to update TT1. The system obtains all nodes from the obtained τ(D), by using getAllNodes(τ(D)), and then assigns all of the obtained nodes to pset.

In step 425, the system judges whether pset is empty or not. If the judgment is negative, the system proceeds to step 426. If the judgment is positive, the system proceeds back to step 423 in order to repeat the steps 423 to 425.

In step 426, the system obtains an element (namely, a set of paragraph nodes for each paragraph) from pset and then assigns the obtained element to N. Next, the system removes the obtained element from pset and then assigns pset-N to pset. The system extracts all of a set of children nodes from the obtained element (N) and then assigns the obtained all of the set of children nodes to chset.

The step 426 corresponds to the process, which is described in the step 304 of FIG. 3, for obtaining a set of paragraph nodes of each paragraph for all paragraphs of all documents.

In step 427, the system obtains all conditions from chest, by using gelallConditions(chest), and then assigns all of the obtained conditions to SLP-cond-set. Next, the system collects SLP-cond-set by SLPcondSetSet<−SLPcond-SetSet∪{SLP-cond-set}. The system repeats the steps 425 to 427 for each pset (namely, until pset becomes empty).

The step 427 corresponds to the process, which process is described in the step 304 of FIG. 3, for obtaining the aforementioned one or more condition sets written by a set of logical formulas by obtaining a set of child nodes belonging to a common parent node in the paragraph tree in which each logical formula is associated with a node and gathering logical formula associated with each of the child nodes in each set of the child nodes.

In step 428, the system sets MCCSs to zero in order to initialize MCCSs.

In step 429, the system judges whether SLPcondSetSet is empty or not. If the judgment is negative, the system proceeds to step 430. If the judgment is positive, the system proceeds to a final step 436.

In step 430, the system obtains an element, namely a first condition set, from SLPcondSetSet and then assigns the obtained element to SLP-conds Next, the system removes the obtained element from SLPcondSetSet by SLPcondSetSet−{SLP-conds} and then assigns SLPcondSetSet−{SLP-conds} to SLPcondSetSet in order to update SLPcondSetSet.

In step 431, the system divides one or more elements in SLP-conds into elements having a common item or parameter, by using devideBySameItemParam(SLP-conds), to generate second condition set and then assigns the second condition set to SLP-cond-sets.

The step 431 corresponds to the process, which is described in the step 305, step (a), of FIG. 3, for dividing one or more elements in each condition set (the first condition set) written by a set of logical formulas into elements having a common item or parameter and other elements.

In step 432, the system judges whether SLP-cond-sets is empty or not. If the judgment is negative, the system proceeds to step 433. If the judgment is positive, the system proceeds back to the step 429 in order to repeat the steps 429 to 431.

In step 433, the system obtains an element (namely, a second condition set which is generated by dividing one or more elements in the first condition set) from SLP-cond-sets and then assigns the obtained element to aset. Next, the system removes the obtained element from SLP-cond-sets by SLP-cond-sets−{aset} and then assigns SLP-cond-sets−{aset} to SLP-cond-sets in order to update SLP-cond-sets.

In step 434, the system translates a specific keyword which is an element of the SLP-cond-sets, namely the second condition set) into a form of a logical formula to generate a third condition set as MCCS, using translateAllOtherwiseIntoLogicalFormula(aset), and then assigns the generated third condition set to mccs.

The step 434 corresponds to the process, which is described in the step 305, step (b), of FIG. 3, for translates a specific keyword which is an element in the second condition set obtained in the step (a) into a form of a logical formula.

In step 435, the system collects a set of MCCSs∪{mccs} and then assigns the collected MCCSs∪{mccs} to MCCSs. The system repeats the steps 432 to 435 for each SLP-cond-set (namely, until SLP-cond-sets becomes empty) to obtain MCCSs.

In step 436, the system terminates the process mentioned above and proceeds to the step 413 of FIG. 4A.

Figure 4C:
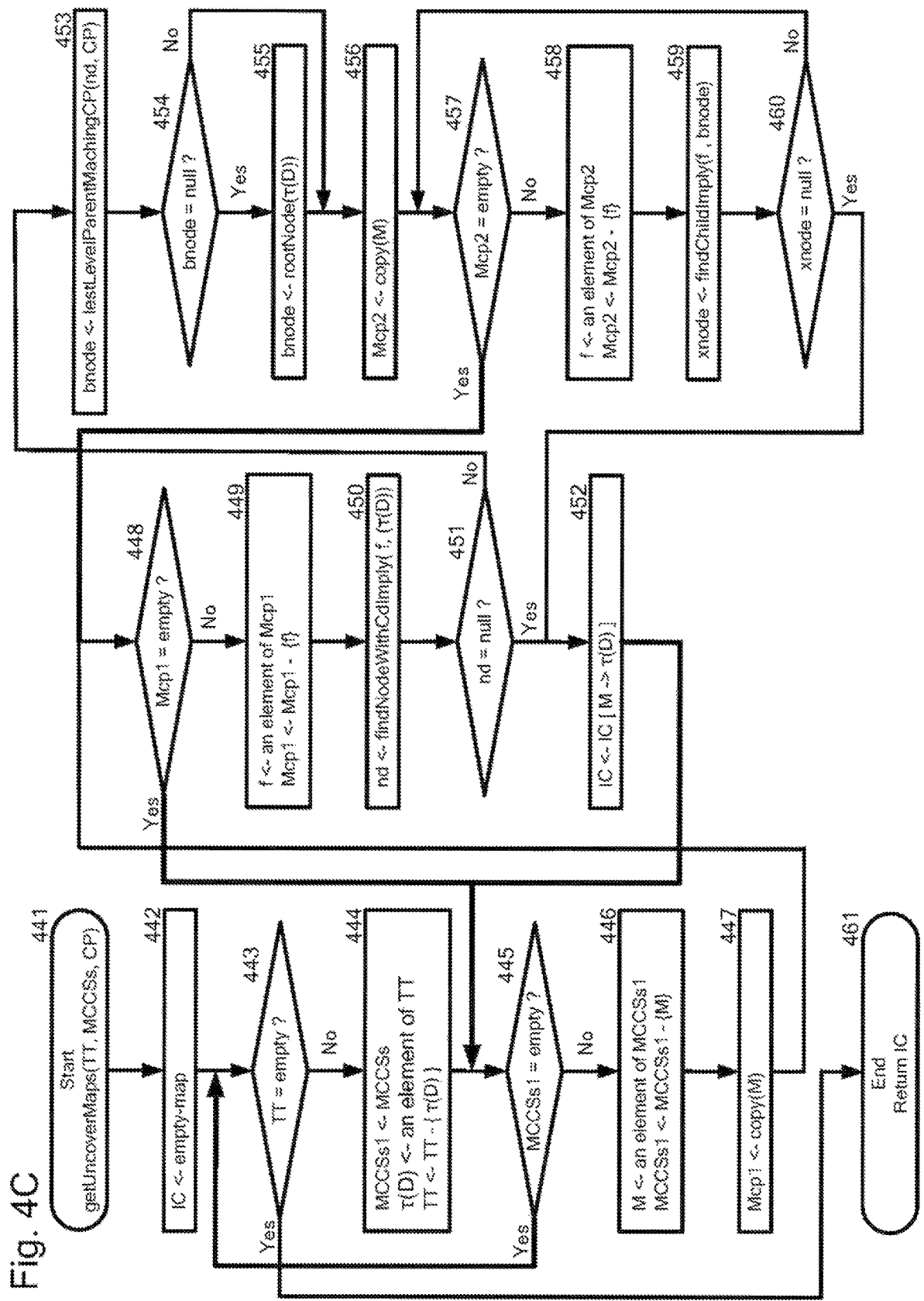
FIG. 4C illustrates an embodiment of a flowchart of a process for judging whether each document is consistent with each MCCS according to the present principles.

With reference now to FIG. 4C, FIG. 4C illustrates an embodiment of a flowchart of a process for judging whether each document is consistent with each MCCS.

In step 441, the system starts the process mentioned above. The system prepares getUncovereMaps(TT, MCCSs, CP).

In step 442, the system prepares empty-map and copy the empty-map to IC.

In step 443, the system judges whether TT is empty or not. If the judgment is negative, the system proceeds to step 444. If the judgment is positive, the system proceeds to a final step 461.

In step 444, the system assigns MCCSs to MCCSs1. Next, the system obtains an element, namely τ(D), from TT. Next, the system removes the obtained τ(D) from TT by TT−{τ(D)} and then assigns TT−{τ(D)} to TT. The system obtains all nodes from the obtained τ(D), by using getAllNodes(τ(D)), and then all of the obtained nodes to pset.

In step 445, the system judges whether MCCSs1 is empty or not. If the judgment is negative, the system proceeds to step 446. If the judgment is positive, the system proceeds back to the step 443 and repeats the steps 443 to 445.

In step 446, the system obtains an element, namely MCCS, from MCCSs1 and then assigns the obtained element to M. Next, the system removes the obtained element from MCCSs1 by MCCSs1−{M} and then assigns MCCSs1−{M} to MCCSs1 in order to update MCCS s 1.

In step 447, the system copies M to Mcp1.

In step 448, the system judges whether Mcp1 is empty or not. If the judgment is negative, the system proceeds to step 449. If the judgment is positive, the system proceeds back to the step 445 and repeats the steps 443 to 445 or steps 445 to 448.

In step 449, the system obtains an element, namely MCCS, from Mcp1 and then assigns the obtained element to f. Next, the system removes the obtained element from Mcp1 by Mcp1-{f} and then assigns MCCSs1-{f} to Mcp1 in order to update Mcp1.

In step 450 which corresponds to the step 306, Step 1, of FIG. 3, the system finds node nd such that f∈C(n) and f implies fi by using, for example, the Depth-first search and then assigns the found nodes to nd In step 451, the system judges whether nd is empty or not. If the judgment is positive, the system proceeds to the step 452. If the judgment is negative, the system proceeds to step 453.

In step 452 which corresponds to the step 306, Step 1-1, of FIG. 3, the system concludes that τ(D) does not satisfy M, if there exists no such node in τ(D). IC [M->τ(D)] is the map defined by IC[M->τ(D)] (M1)=IC(M1) if M=/=M1 and IC[M->τ(D)] (M1)=τ(D) if M=M1. The system assigns IC [M->τ(D)] to IC.

In step 453, which corresponds to the step 306, Step 1-2-1, of FIG. 3, the system finds the base node of quality inspection, bnode, such that bnode is a parent node of node nd and bnode matches the check policy.

In step 454, the system judges whether bnode is null or not. If the judgment is positive, the system proceeds to step 455 below. If the judgment is negative, the system proceeds to step 456 below.

In step 455, the system sets a root node in τ(D) as bnode because such bnode does not exists. Next, the system assigns the root node to bode.

In step 456, the system copies M to Mcp2.

In step 457, the system judges whether Mcp2 is empty or not. If the judgment is negative, the system proceeds to step 458 below. If the judgment is positive, the system proceeds back to step 448 and repeats the steps 448 to 457. Further, if the judgment is positive, the system concludes that the system concludes that τ(D) satisfies M, because such xnode_1, . . . , xnode_n exists.

In step 458, the system obtains an element, namely MCCS, from Mcp2 and then assigns the obtained element to f. Next, the system removes the obtained element from Mcp2 by Mcp2-{f} and then assigns Mcp2-{f} to Mcp2 in order to update Mcp2.

In step 459, which corresponds to the step 306, Step 1-2-2, the system finds xnode_i (i=1, . . . , n) such that each xnode_i is a child node of bnode and there exists x_i∈C (xnode_i) satisfying that x_i implies fi. Next, the system assigns the found xnode to xnode.

In step 460, the system judges whether xnode is null or not. If the judgment is positive, the system proceeds back to step 452 and repeats the steps 448 to 460. Further, if the judgment is positive, the system concludes that τ(D) does not satisfy M, because such xnode_1, . . . , xnode_n does not exist (see Step 1-2-2-2). If the judgment is negative, the system proceeds to step 457. Further, if the judgment of step 460 is negative and the judgment of step 457 is positive, the system concludes that τ(D) satisfies M, because such xnode_1, . . . , xnode_n exists (see Step 1-2-2-1).

In step 460, the system terminates the process mentioned above and proceeds to the step 414 of FIG. 4A.

Figure 4D:
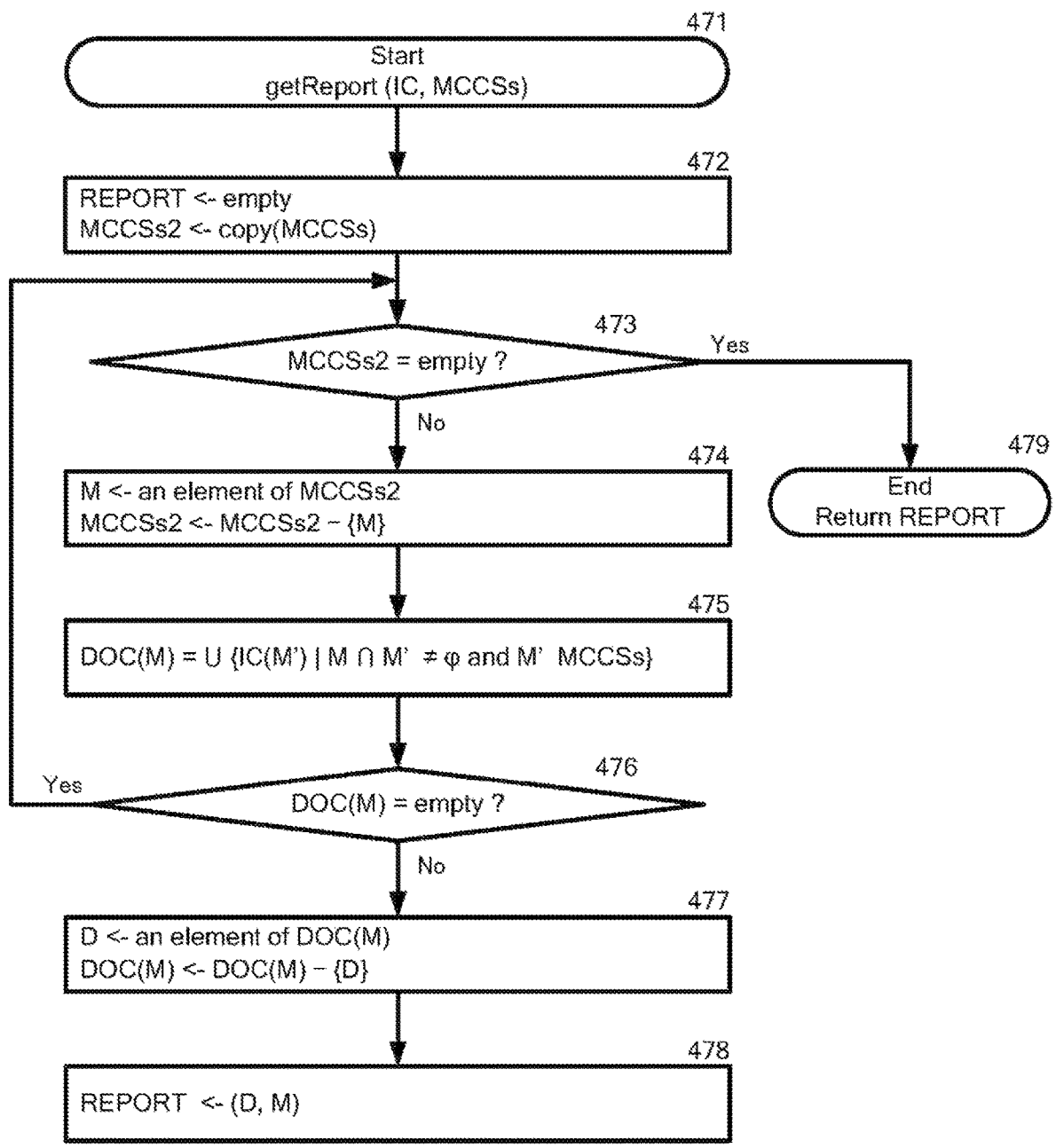
FIG. 4D illustrates an embodiment of a flowchart of a process for preparing a report of the judged documents according to the present principles.

With reference now to FIG. 4D, FIG. 4D illustrates an embodiment of a flowchart of a process for preparing a report of the judged documents.

In step 471, the system starts the process mentioned above. The system prepares getReport(IC, MCCSs).

In step 472, the system sets REPORT to zero in order to initialize REPORT. Further, the system copies MCCSs to MCCSs2.

In step 473, the system judges whether MCCSs2 is empty or not. If the judgment is negative, the system proceeds to step 474. If the judgment is positive, the system proceeds to a final step 479.

In step 474, the system obtains an element, namely MCCS, from MCCSs2 and then assigns the obtained element to M. Next, the system removes the obtained element from MCCSs2 by MCCSs2-{M} and then assigns MCCSs2-{M} to MCCSs2 in order to update MCCSs2.

In step 475, which corresponds to step 307 of FIG. 3, the system calculates a set of documents DOC (M) such that DOC(M)=∪{IC(M')|M∩M'≠φ and M'∈MCCSs} to prepare a report and then assigns the obtained DOC(M) to DOC(M).

In step 476, the system judges whether DOC (M) is empty or not. If the judgment is negative, the system proceeds to step 477. If the judgment is positive, the system proceeds back to the step 473 and repeats the steps 473 to 476 for each MCCS (namely, until MCCSs2 becomes empty).

In step 477, the system obtains an element, namely a document, from DOC(M) and then assigns the obtained element to D. Next, the system removes the obtained element from DOC(M) by DOC(M)-{D} and then assigns DOC(M)-{D} to DOC(M) in order to update DOC(M).

In step 478, the system prepares a set of (D, M) and then assigns (D, M) to REPORT.

In step 479, the system terminates the process mentioned above and proceeds to the step 415 of FIG. 4A.

Figure 5:
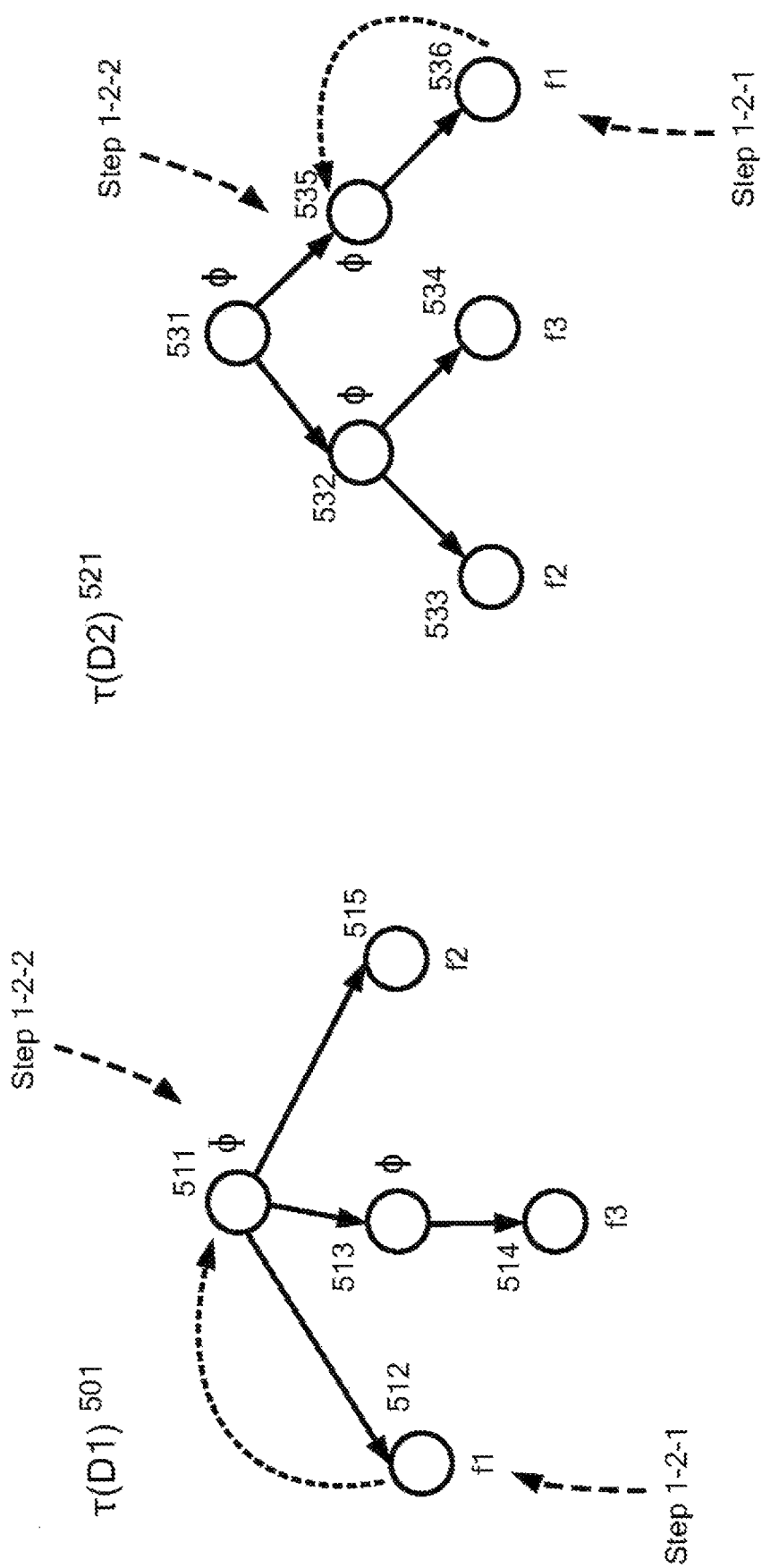
FIG. 5 illustrates embodiments of setting bnode which is used as a base node of quality inspection according to the present principles.

With reference now to FIG. 5, FIG. 5 illustrates embodiments of setting bnode which is used as a base node of quality inspection and judging whether a document satisfies the MCCS, using the condition set-annotated paragraph tree.

For MCCS M, M is set to ={f1,f2,f3}. The check policy, cp, is defined as cp={true, (*ing|peform|process)}. The condition flag in the cp is set to "true". The regular expression in the cp is set to "(*ing|peform|process)". The condition flag, "true", means that the check policy matches node where some conditions are extracted. The regular expression, "(*ing|peform|process)", means that the check policy matches a node containing a paragraph text that matches the regular expression.

For the condition set-annotated paragraph tree D1, τ(D1) (501), the process for setting bnode will be explained below.

The system finds the node nd (512) which has the logical formula f1 that implies f1. Next, the system can find the node (511) as a root note of τ(D1), using the check policy. Then, the system sets the node (511) as bnode.

After the system finds the bnode (511), the system judges whether τ(D1) satisfies M={f1,f2,f3}. The bnode (511), as the parent node, has the child node (515), which has the logical formula f2 that implies f2, and the grandchild node (514), which has the logical formula f3 that implies f3 and which is a child node of node (513). Therefore, the system judges that τ(D1) satisfies M={f1,f2,f3}. Accordingly, the system does not report a result to a user.

For the condition set-annotated paragraph tree D2, τ(D2) (521), the process for setting bnode will be explained below.

The system finds the node nd (536) which has the logical formula f1 that implies f1. Let us suppose that the node (535) has the text, "search process. Next, the system assumes that node (535) matches the check policy because the node (535) has the text, "search process". Then, the system sets the node (535) as bnode.

After the system finds the bnode (535), the system judges whether τ(D2) satisfies M={f1,f2,f3}. The bnode (535), as the parent node, has neither the child node (533), which has the logical formula f2 that implies f2, nor the child node (534) which has the logical formula f3 that implies f3. Nodes (533) and (534) are child nodes of node (532) and grandchild nodes of node (531). Therefore, the system judges that τ(D2) does not satisfy M={f1,f2,f3}. Accordingly, the system reports to a user a result stating to the effect that the document comprising τ(D2) is inconsistent with regard to the condition description and inclusiveness or that (D2) in the document is inconsistent with regard to the condition description and inclusiveness.

Figure 6:
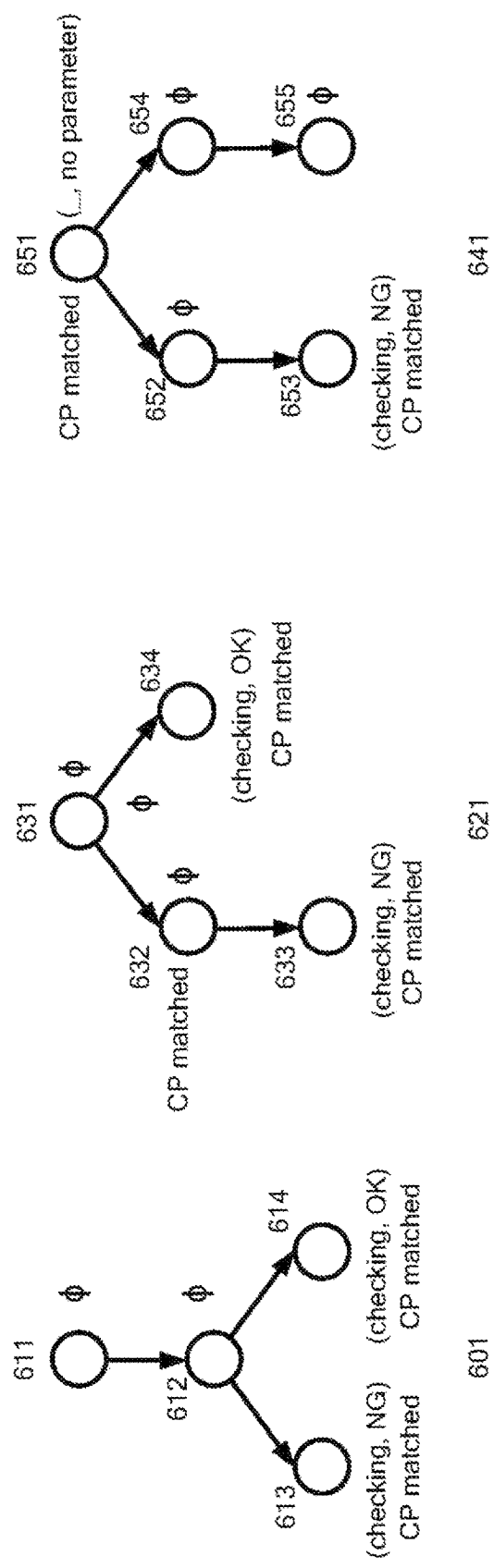
FIG. 6 illustrates embodiments of performing quality inspection, using condition sets, according to one embodiment of the present principles.

With reference now to FIG. 6, FIG. 6 illustrates embodiments of performing quality inspection, using condition sets according to one embodiment of the present principles.

Descriptions 1 to 3 (201, 202 and 203, respectively) in the document are the same as those described in FIG. 2.

The system generates a condition set used for quality inspection, namely MCCS, from Descriptions 1 (201). Let us suppose that only one MCCS, M, is generated and M={(checking, NG), (checking, OK)}. This is because, in the other parts, there is only one condition in child paragraphs of the same parent.

The system judges whether each of Descriptions 1 to 3 (201, 202 and 203, respectively) in the document satisfies MCCS M or not. In detail, the system judges whether, when there is a paragraph containing one condition, (checking, NG), there is a paragraph which contains another condition, (checking, OK) under the common parent paragraph satisfying the check policy. The following check policy is used: cp={true, (*ing|peform|process)}.

For Description 1 (201), the system generates the condition set-annotated paragraph tree (601) of Description 1 (201). The system finds the node (613) containing (checking, NG) as a child node, using the CP. Next, the system finds the node (612), using the CP, and sets the node (612) as a parent node of the child node (613). Node (612) is also the child node of node (611). After then, the system searches for a same-rank level child node which is a child node of the common parent node (612) and contains (checking, OK), using the CP. The system finds the node (614) which is a child node of the common parent node (612) and contains (checking, OK). Accordingly, the system concludes that the condition set-annotated paragraph tree (601) of Description 1 (201) satisfies MCCS M.

For Description 2 (202), the system generates the condition set-annotated paragraph tree (621) of Description 2 (202). The system finds the node (633) containing (checking, NG) as a child node, using the CP. Next, the system finds the node (632), using the CP, and sets the node (632) as a parent node of the child node (633). After then, the system searches for a same-rank level child node which is a child node of the common parent node (632) and contains (checking, OK), using the CP. However, the system cannot find a node which is a child node of the common parent node (632) and contains (checking, OK). Therefore, the system concludes that the condition set-annotated paragraph tree (621) of Description 2 (202) does not satisfy MCCS M. Accordingly, the system reports Description 2 (202) as an improper description and further may report to the effect that Description 2 (202) has an improper paragraph usage.

For Description 2 (202), the system further finds the node (634) containing (checking, OK) as a child node, using the CP. Next, the system finds the root node (631), using the CP, and sets the root node (631) as a parent node of the child node (634). After then, the system searches for a same-rank level child node which is a child node of the common parent node (631) and contains (checking, NG), using the CP. However, the system cannot find a node which is a child node of the common parent node (631) and contains (checking, NG). Therefore, the system concludes that the condition set-annotated paragraph tree (621) of Description 2 (202) does not satisfy MCCS M. Accordingly, the system reports Description 2 (202) as an improper description and further may report to the effect that Description 2 (202) has an improper paragraph usage.

For Description 3 (203), the system generates the condition set-annotated paragraph tree (641) of Description 3 (203). The system finds the node (653) containing (checking, NG) as a child node, using the CP. Next, the system finds the root node (651), using the CP, and sets the root node (651) as a parent node of the child node (653). The root node (651) is the parent node of nodes (652) and (654). Node (652) is the parent node of node (653), and node (654) is the parent node of node (655). After then, the system searches for a same-rank level child node which is a child node of the common parent node (651) and contains (checking, OK), using the CP. However, the system cannot find a node which is a child node of the common parent node (651) and contains (checking, OK). Therefore, the system concludes that the condition set-annotated paragraph tree (641) of Description 3 (203) does not satisfy MCCS M. Accordingly, the system reports Description 3 (203) as an improper description and further may report to the effect that Description 3 (203) does not have another case condition for normal case.

Figure 7B:
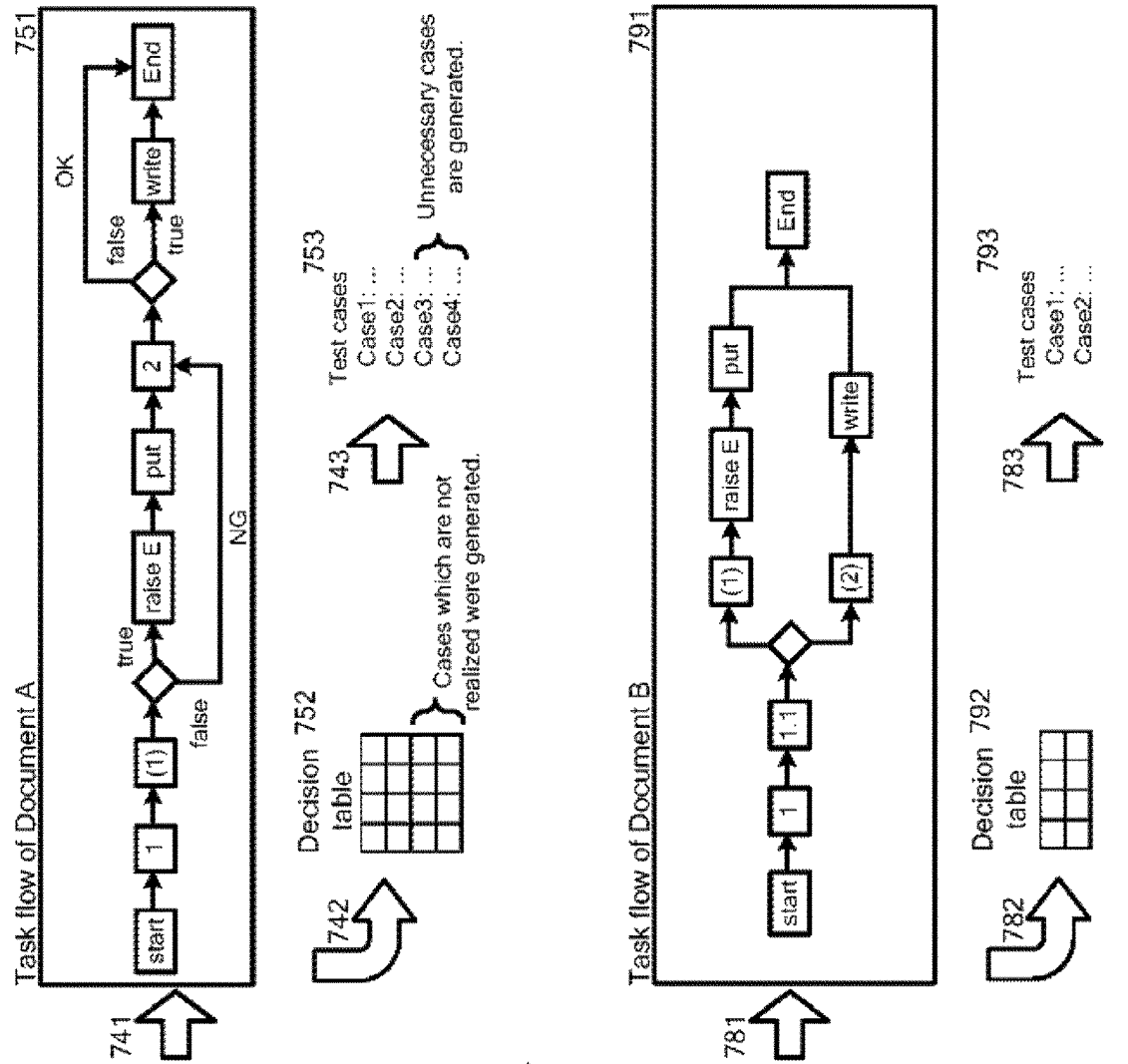
FIG. 7B illustrates an embodiment of revising a document, based on a report output according to an embodiment of the present principles.
Figure 8:
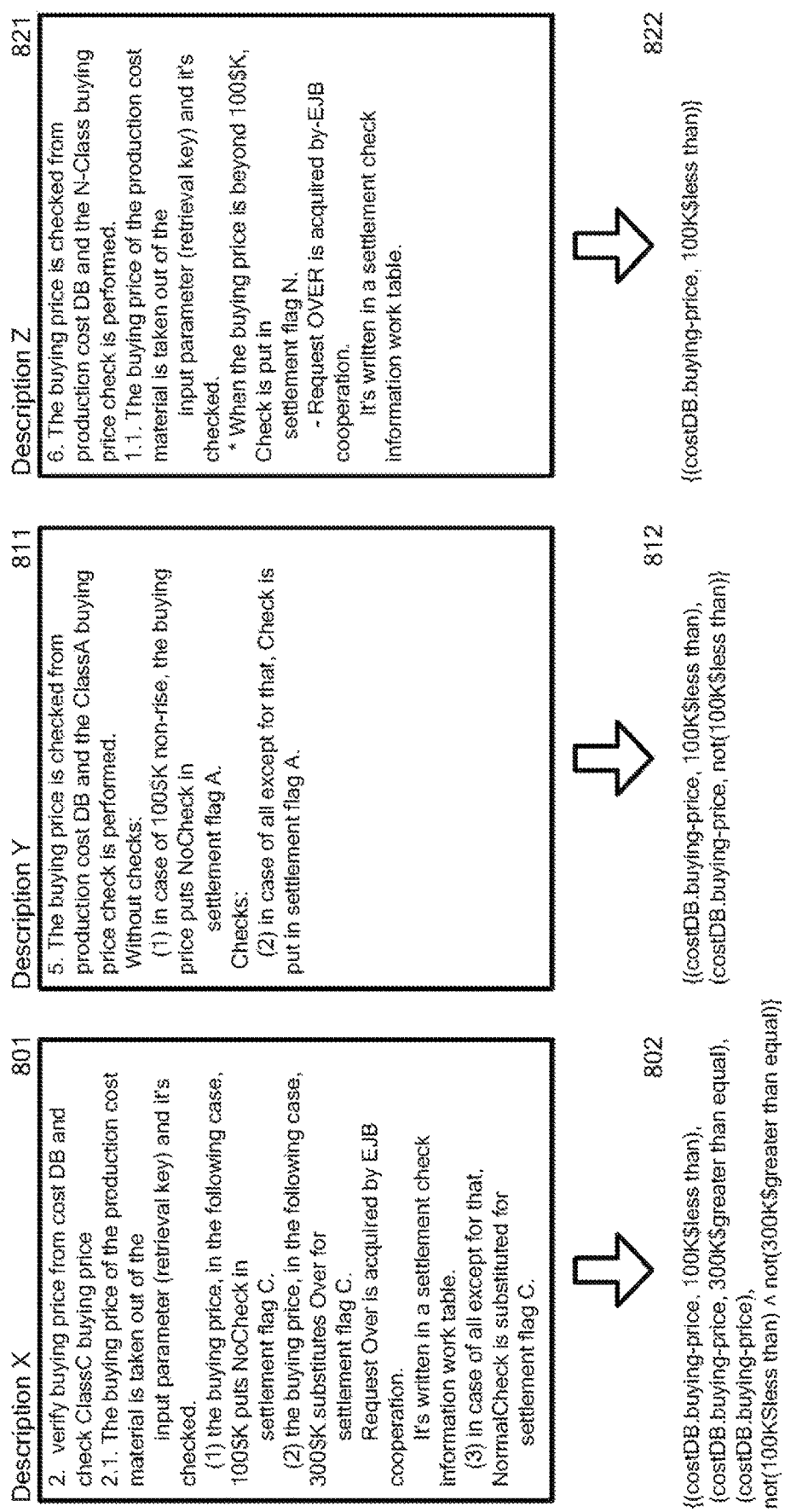
FIG. 8 illustrates an embodiment of performing quality inspection on documents, according to an embodiment of the present principles.

FIGS. 7A, 7B and 8 illustrate an embodiment of performing quality inspection on documents, according to an embodiment of the present principles.

With reference now to FIG. 7A, FIG. 7A illustrates three types of Documents on which an embodiment of quality inspection on the documents is performed according to an embodiment of the present principles.

Let us suppose that there are three types of Documents A to C (701, 711 and 721, respectively) which describe function descriptions. Each of Documents A to C (701, 711 and 721) has listing and nested paragraphs. In each of Documents A to C (701, 711 and 721), the underlines are intentionally added for ease of explanation.

For a document quality inspection, the following check policy is used: cp=(cflag, reg=(*ing|perform|process)).

For Document A (701), the system generates a condition set which is located at the same level, "{("checking", "NG")}{("checking", "OK")}" (702). For Document B (711), the system generates a condition set which is located at the same level, "{("checking", "NG")("checking", "OK")}" (712). For Document C (721), the system generates a condition set which is located at the same level, {("checking", "NG")} {("checking", "OK")} (722).

The system generates the following MCCS: {("checking", "NG")("checking", "OK")}.

For Document A (701), the system generates a condition set-annotated paragraph tree from Document A (701) and then judges whether the condition set-annotated paragraph tree satisfies the MCCS or not. The system searches for ("checking", "NG") in the condition set-annotated paragraph tree. After the system finds a node containing ("checking", "NG"), the system finds a parent node of the node containing ("checking", "OK"). After then, the system searches for a same-rank level child node which is a child node of the common parent node and contains (checking, OK), using the CP. However, there is no node containing ("checking", "OK") under the paragraph 1. Accordingly, the system put a warning message.

For Document A (701), the system further searches for ("checking", "OK") in the condition set-annotated paragraph tree. After the system finds a node containing ("checking", "OK"), the system finds a parent node of the node containing ("checking", "OK"). After then, the system searches for a same-rank level child node which is a child node of the common parent node and contains (checking, NG), using the CP. However, there is no node containing ("checking", "NG") under the paragraph 1. Accordingly, the system reports a warning message for Document A (701).

For Document B (711), the system generates a condition set-annotated paragraph tree from Document B (711) and then judges whether the condition set-annotated paragraph tree satisfies the MCCS or not. The system searches for ("checking", "NG") in the condition set-annotated paragraph tree. After the system finds a node containing ("checking", "NG"), the system finds a parent node of the node containing ("checking", "OK"). After then, the system searches for a same-rank level child node which is a child node of the common parent node and contains (checking, OK), using the CP. There is the node containing ("checking", "OK") under the paragraph "1". Therefore, the system can find the same-rank level child node. This means that the condition set-annotated paragraph tree satisfies the MCCS. Accordingly, there is no need to put warning message for Document B (711).

For Document C (721), the system generates a condition set-annotated paragraph tree from Document C (721) and then judges whether the condition set-annotated paragraph tree satisfies the MCCS or not. The system searches for ("checking", "NG") in the condition set-annotated paragraph tree. After the system finds a node containing ("checking", "NG"), the system finds a parent node of the node containing ("checking", "OK"). After then, the system searches for a same-rank level child node which is a child node of the common parent node and contains (checking, OK), using the CP. There is the node containing ("checking", "OK") on paragraph (2) under the paragraph "*check the value of print-out data". Therefore, the system can find the same-rank level child node. This means that the condition set-annotated paragraph tree satisfies the MCCS. Accordingly, there is no need to put warning message for Document C (721).

Accordingly, the system reports Document A (701) as a candidate to be reviewed carefully.

A user who receives the report from the system can review Document A (701) and revise descriptions in Document A (701).

With reference now to FIG. 7B, FIG. 7B illustrates an embodiment of revising a document, based on a report output according to an embodiment of the present principles.

FIG. 7B illustrates Documents A (731) and B (771). Document A (731) relates to a cross description with sequential tasks and conditional branch. Document B (771) relates to a structured description with sequential tasks and conditional branch.

Document A (731) is the same as Document A (701) of FIG. 7A. In Document A (731), the phrase, "checking is NG", is described on the sub-paragraph (1) under the paragraph 1, and the phrase, "checking is OK", is described on the paragraph 2. Therefore, exclusive conditions are described on different paragraph (1) and 2. Accordingly, it is concluded that Document A (731) was not described properly about exclusive conditions.

The task flow (751) of Document A (731) was generated (741) from Document A (731). The task flow (751) shows that there are four passes. However, the following two passes cannot be realized: Start-1-(1)-false-2-false-end, Start-1-(1)-true-2-true-End.

The decision table (752) of Document A (731) was generated (742). The decision table (752) shows that cases which are not realized were generated.

The test cases (753) were generated (743) by transforming the decision table (752). The test cases (753) show that unnecessary cases were generated.

Accordingly, it is understood that quality and productivity relating to Document A (731) go down.

The user reviewed Document A (731) and generated (761) Document B (771). In Document B (771), the phrase, "checking is NG", is described on the sub-paragraph (1) under the paragraph 1, and the phrase, "checking is OK", is described on the sub-paragraph (2) under the paragraph 1. Therefore, exclusive conditions are described on the same-rank level child paragraph. Accordingly, Document B (771) was described properly about exclusive conditions.

The task flow (791) of Document B (771) was generated (781) from Document B (771). The task flow (791) shows that there are two passes and all of the passes can be realized.

The decision table (792) of Document B (771) was generated (782). The decision table (792) shows that cases which are not realized were not generated.

The test cases (793) were generated (783) by transforming the decision table (792). The test cases (793) show that unnecessary cases are not generated.

Accordingly, it is understood that quality and productivity relating to Document B (771) go up.

With reference now to FIG. 8, FIG. 8 illustrates an embodiment of three types of descriptions on which an embodiment of quality inspection is performed according to an embodiment of the present principles.

Let us suppose that there are three types of Descriptions X to Z (801, 811 and 821, respectively) in a document, which Descriptions describe function descriptions. Each of Descriptions X to Z (801, 811 and 821) has listing and nested paragraphs.

For a document quality inspection, the following check policy is used: cp=(cflag, reg=(*ing|perform|process)).

For Description X (801), the system generates a condition set which is located at the same level, "{(costDB.buying-price, 100K$less than), (costDB.buying-price, 300K$greater than equal), (costDB.buying-price), not (100K$less than)∧ not(300K$greater than equal)}" (802). For Description Y (811), the system generates a condition set which is located at the same level, "{(costDB.buying-price, 100K$less than), (costDB.buying-price, not(100K$less than)}" (812). For Description Z (821), the system generates a condition set which is located at the same level, {(costDB.buying-price, 100K$less than)} (822).

The system generates the following two MCCSs: M1={ (costDB.buying-price, 100K$less than), (costDB.buying-price, 300K$greater than equal), (costDB.buying-price), not (100K$less than)∧ not(300K$greater than equal)}; and M2={(costDB.buying-price, 100K$less than), (costDB.buying-price, not(100K$less than)}. M1 is derived from Description X (801). M2 is derived from Description Y (811).

For Description X (801), the system generates a condition set-annotated paragraph tree from Description X (801) and then judges whether the condition set-annotated paragraph tree satisfies the MCCS or not. The system concludes that the condition set-annotated paragraph tree coves M1 and also M2. Accordingly, there is no need to put warning message for Description X (801).

For Description Y (811), the system generates a condition set-annotated paragraph tree from Description Y (811) and then judges whether the condition set-annotated paragraph tree satisfies the MCCS or not. The system concludes that the condition set-annotated paragraph tree coves M2 and also M1. Accordingly, there is no need to put warning message for Description Y (811).

For Description Z (821), the system generates a condition set-annotated paragraph tree from Description Z (821) and then judges whether the condition set-annotated paragraph tree satisfies the MCCS or not. The system concludes that the condition set-annotated paragraph tree coves neither M1 nor M2. Accordingly, the system put a warning message. For example, for M1, "(costDB.buying-price, 300K$greater than equal), (costDB.buying-price), not(100K$less than) $\wedge$ not(300K$greater than equal)" is output as a difference; and, for M2, "(costDB.buying-price, not(100K$less than))" is output as a difference.

Accordingly, the system reports Description Z (821) as a candidate to be reviewed carefully.

A user who receives the report from the system can review Description Z (821) and revise descriptions in Description Z (821).

In a case of Description Z (821), a description of a default case lacks.

Figure 9:
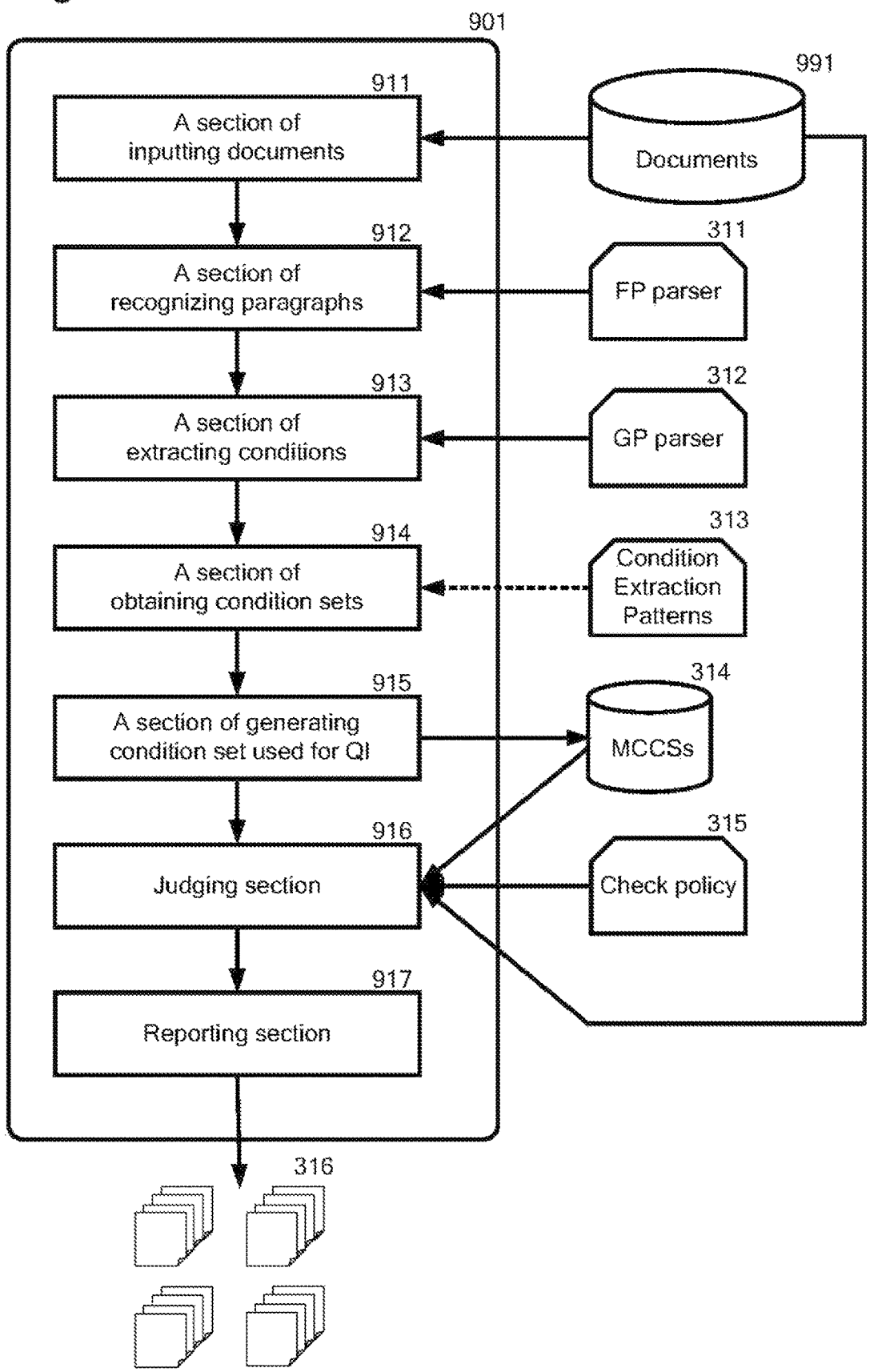
FIG. 9 illustrates an embodiment of an overall functional block diagram of a computer system hardware used in accordance with the embodiment of the flowcharts described in FIG. 3 and FIGS. 4A to 4D according to the present principles.

With reference now to FIG. 9, FIG. 9 illustrates an embodiment of an overall functional block diagram of a computer system hardware used in accordance with the embodiment of the flowcharts described in FIG. 3 and FIGS. 4A to 4D.

The system (901) may correspond to the computer (101) described in FIG. 1.

The system (901) comprises a section of inputting document (911), a section of recognizing paragraphs (912), a section of extracting conditions (913), a section of obtaining condition sets (914), a section of generating condition set used for QI (915), a judging section (916) and a reporting section (917).

The section of inputting document (911) may perform step 301 described in FIG. 3.

The section of recognizing paragraphs (912) may recognize one or more paragraphs in each document having one or more listing and nested paragraphs and generate one or more paragraph trees.

The section of recognizing paragraphs (912) may perform step 302 described in FIG. 3.

The section of extracting conditions (913) may extract one or more conditions as a logical formula from each paragraph text comprising a condition expression.

The section of extracting conditions (913) may perform step 303 described in FIG. 3.

The section of obtaining condition sets (914) may obtain one or more condition sets written by a set of logical formulas from the one or more extracted conditions, according to a set of child nodes belonging to each common parent node in each of the paragraph trees.

The section of obtaining condition sets (914) may perform step 304 described in FIG. 3.

The section of generating condition set used for QI (915) may generate one condition set used for quality inspection, for each of the one or more condition sets written by the set of logical formulas.

The section of generating condition set used for QI (915) may perform step 305 described in FIG. 3.

The judging section (916) may judge whether a document in the one or more documents (991) satisfies any one of the one or more condition sets used for quality inspection or not. The judging section (916) may conclude that the judged document does not have any inconsistent description, if the judgment is positive. The judging section (916) may conclude that the judged document has any inconsistent description, if the judgment is negative.

The judging section (916) may perform step 306 described in FIG. 3.

The reporting section (917) may report the judged document, if the judgment carried out by the judging section (916) is negative.

The reporting section (917) may perform steps 307 and 308 described in FIG. 3.

EXAMPLES

The system generates ten MCCSs listed below from 33 target documents, according to an embodiment of the present principles.

1. {(checking, OK), (checking, NG)}
2. {(_, the project exists in the transform project file), (_, no transform target)$\wedge$(_, the project exists in the integrate project file)}
3. {(return code, 1)$\vee$(return code, 2)$\vee$(return code, 3)$\vee$(return code, 5)
4. {(return code, 1), (return code, 2), (return code, 3), (return code, 4), (return code, 5)}
5. {(_, there exist more than 1), (_, no exist)}
6. {(_, configuration block=6), (_, configuration block!=6)}
7. {(_, selected line block=6), (_, selected line block=0)}
8. {(_, selected line block=6), (_, selected line block=0 (in case of DISCAS))}
9. {(_, present design No), (_, reference No), (_, new configuration No)}
10. {(_, all configurations have been created), (_, all configurations have not been created)}

The reports were output after quality inspection of the 33 target documents mentioned above, according to an embodiment of the present principles. The report includes twelve documents and descriptions containing quality problems relating to condition coverage or expression consistency. Ten documents among twelve documents actually contained quality problems that should be reported as a result of the quality inspection, while two documents did not contain quality problems that should be reported as a result of the quality inspection.

The following Reports 1 to 3 are examples which were reported by the system.

Report 1: There are documents (or descriptions) containing the condition (checking, OK), but not containing (checking, NG); description parts for MCCS1: Eight documents related to this problem.

Report 2: There are documents (or descriptions) containing the condition (return code, 5), but not containing (return code, 4): description parts for MCCSs 3 and 4; Two documents are related to this problem (Notes by the inventors of the present invention: these parts actually should be reported by manual quality inspection for documents.).

Report 3: There are documents (or descriptions) containing the condition (_,selected line block=6), but not containing (_, selected line block=0): descriptions for MCCSs 7 and 8; Two documents related to this problem (Notes by the inventors of the present invention: it was found by manually reviewing these documents that these parts are actually no problem (namely, wrong reporting)).

The present principles may be in the form of a method, a system, and/or a computer program product. The computer program product may include a computer readable storage medium (or media) having computer readable program instructions thereon for causing a processor to carry out aspects of the present principles.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present principles may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present principles.

Aspects of the present principles are described herein with reference to flowchart illustrations and/or block diagrams of methods, apparatus (systems), and computer program products according to embodiments of the present principles. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present principles. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for performing a quality inspection on one or more portions of two or more documents based on generating one or more condition sets from the two or more documents, the method comprising:

recognizing one or more paragraphs in each of the two or more documents having one or more listing and nested paragraphs and generating one or more paragraph trees having one or more nodes and one or more edges, wherein each of the one or more nodes in the one or more paragraph trees corresponds to a paragraph text in the two or more documents and each of the one or more edges in the one or more paragraph trees corresponds to a parent-child relation between the one or more paragraphs in the two or more documents;

extracting one or more conditions as a logical formula from each paragraph text, in the one or more portions of the two or more documents, comprising a condition expression;

obtaining one or more condition sets written by a set of logical formulas from the one or more extracted conditions, according to a set of child nodes belonging to each of one or more common parent nodes in each of the one or more paragraph trees;

generating a must-cover-condition set (MCCS) used for quality inspection for each of the one or more condition sets written by the set of logical formulas;

inserting one or more warning messages into the one or more portions of the two or more documents, responsive to a failure to satisfy one or more conditions of the MCCS used for quality inspection, the one or more conditions including missing, improperly described, inconsistently described, and extra conditions from the one or more conditions for the one or more portions of the two or more documents; and iteratively revising each portion of the two or more documents with the warning messages inserted to satisfy the failed conditions of the MCCS used for quality inspection until the conditions of the MCCS are satisfied for the two or more documents.

2. The method according to claim 1, wherein at least one of:

the recognizing is performed using a parser for extracting the one or more paragraphs; and the extracting is performed using a parser for extracting the one or more conditions.

3. The method according to claim 1, further comprising:

associating each logical formula in the set of logical formulas with a node in the one or more paragraph trees, the node corresponding to a paragraph text from which each logical formula was extracted.

4. The method according to claim 3, wherein the obtaining one or more condition sets written by the set of logical formulas is performed by obtaining at least one set of child nodes belonging to a common parent node in the one or more paragraph trees in which each logical formula is associated with a node and a gathering logical formula associated with each child node in each set of child nodes.

5. The method according to claim 4, wherein the generating the MCCS used for quality inspection for each of the one or more condition sets written by the set of logical formulas is performed by dividing one or more elements in each of the one or more condition sets written by the set of logical formulas into elements having a common item or parameter and other elements, wherein, if the logical formula can be of the form (A, C), the form (A, C) means that an item or parameter A has a value of C or satisfies constraint C.

6. The method according to claim 4, wherein the generating the condition set used for quality inspection for each of the one or more condition sets written by the set of logical formulas comprises:

dividing one or more elements in each of the one or more condition sets written by the set of logical formulas into elements having a common item or parameter and other elements to generate one or more second condition sets; and translating a specific keyword, which is an element in the one or more second condition sets, into a form of a logical formula, wherein, if the logical formula can be of the form (A, C), the form (A, C) means that an item or parameter A has a value of C or satisfies constraint C.

7. A computer-implemented method for performing quality inspection on one or more portions of two or more documents, the method comprising:

recognizing one or more paragraphs in each of the two or more documents having one or more listing and nested paragraphs and generating one or more paragraph trees having one or more nodes and one or more edges, wherein each of the one or more nodes in the one or more paragraph trees corresponds to a paragraph text in the two or more documents and each of the one or more edges in the one or more paragraph trees corresponds to a parent-child relation between the one or more paragraphs in the two or more documents;

extracting one or more conditions as a logical formula from each paragraph text, in the one or more portions of the two or more documents, comprising a condition expression;

obtaining one or more condition sets written by a set of logical formulas from the one or more extracted conditions, according to a set of child nodes belonging to each of one or more common parent nodes in each of the one or more paragraph trees;

generating a must-cover-condition set (MCCS) used for quality inspection for each of the one or more condition sets written by the set of logical formulas;

judging whether or not a document in the two or more documents satisfies any one of the one or more condition sets used for quality inspection;

concluding, if the judgment is positive, that the judged document does not have any inconsistent description or, if the judgment is negative, that the judged document has any inconsistent description;

inserting one or more warning messages into the one or more portions of the two or more documents, responsive to a failure to satisfy one or more conditions of the MCCS used for quality inspection, the one or more conditions including missing, improperly described, inconsistently described, and extra conditions from the one or more conditions for the one or more portions of the two or more documents; and iteratively revising each portion of the two or more documents with the warning messages inserted to satisfy the failed conditions of the MCCS used for quality inspection until the conditions of the MCCS are satisfied for the two or more documents.

8. The method according to claim 7, further comprising reporting the judged document if the judgment is negative.

9. The method according to claim 7, wherein the judging is performed by judging whether the one or more paragraph trees in which each logical formula is associated with a node satisfies at least one of the one or more condition sets used for quality inspection.

10. The method according to claim 7, wherein the judgment is performed by:
   judging whether the one or more paragraph trees in which each logical formula is associated with a node have a node with which a logical formula corresponding to one condition comprised in one condition set used for quality inspection is associated;
   searching, if the judgment is positive, for a parent node of the node with which a logical formula corresponding to the one condition is associated, using a check policy; and
   judging, if the parent node is found, whether the parent node has child nodes with which each logical formula corresponding to each of a remaining one or more conditions comprised in the condition set which comprises the one condition is associated or not.

11. The method according to claim 10, wherein, if the one or more paragraph trees in which each logical formula is associated with a node do not have a child node with which a logical formula corresponding to one condition comprised in the one or more condition sets used for quality inspection is associated, a conclusion is made that the judged document does not satisfy the one or more condition sets used for quality inspection.

12. The method according to claim 10, wherein, if the parent node does not have one or more child nodes with which each logical formula corresponding to each of the remaining one or more conditions comprised in the condition set which comprises the one condition is associated, a conclusion is made that the judged document does not satisfy the one or more condition sets used for quality inspection.

13. The method according to claim 10, wherein, if the parent node has all child nodes with which each logical formula corresponding to each of the remaining one or more conditions comprised in the condition set which comprises the one condition is associated, a conclusion is made that the judged document satisfies the one or more condition sets used for quality inspection.

14. The method according to claim 10, wherein the check policy is used to specify a parent node as a base node from which a child node may be found.

15. A system comprising:
   a non-transitory computer-readable memory operatively coupled to a processor device, the processor device being configured to perform a first operation for generating one or more condition sets from one or more portions of two or more documents, the first operation comprising:
      recognizing one or more paragraphs in each of the two or more documents having one or more listing and nested paragraphs and generating one or more paragraph trees having one or more node and one or more edges, wherein each of the one or more nodes in the one or more paragraph trees corresponds to a paragraph text in the two or more documents and each of the one or more edges in the one or more paragraph trees corresponds to a parent-child relation between the one or more paragraphs in the two or more documents;
      extracting one or more conditions as a logical formula from each paragraph text, in the one or more portions of the two or more documents, comprising a condition expression;
      obtaining one or more condition sets written by a set of logical formulas from the one or more extracted conditions, according to a set of child nodes belonging to each of one or more common parent nodes in each of the one or more paragraph trees;
      generating a must-cover-condition set (MCCS) used for quality inspection for each of the one or more condition sets written by the set of logical formulas;
      inserting one or more warning messages into the one or more portions of the two or more documents, responsive to a failure to satisfy one or more conditions of the MCCS used for quality inspection, the one or more conditions including missing, improperly described, inconsistently described, and extra conditions from the one or more conditions for the one or more portions of the two or more documents; and
      iteratively revising each portion of the two or more documents with the warning messages inserted to satisfy the failed conditions of the MCCS used for quality inspection until the conditions of the MCCS are satisfied for the two or more documents.

16. The system according to claim 15, wherein the program further performs a second operation for performing quality inspection on the two or more documents, the second operation comprising:
   judging whether or not a document in the two or more documents satisfies any one of the one or more condition sets used for quality inspection; and
   concluding, if the judgment is positive, that the judged document does not have any inconsistent description or, if the judgment is negative, that the judged document has any inconsistent description.

17. The system according to claim 16, wherein the second operation further comprises reporting the judged document, if the judgment is negative.

18. A computer program product comprising a computer readable storage medium having program instructions embodied therewith, wherein the computer readable storage medium is not a transitory signal per se, the program instructions executable by a computer to cause the computer to perform a method for performing a quality inspection on one or more portions of two or more documents based on generating one or more condition sets from the two or more documents comprising:
   recognizing one or more paragraphs in each of the two or more documents having one or more listing and nested paragraphs and generating one or more paragraph trees having one or more nodes and one or more edges, wherein each of the one or more nodes in the one or more paragraph trees corresponds to a paragraph text in the two or more documents and each of the one or more edges in the one or more paragraph trees corresponds to a parent-child relation between the one or more paragraphs in the two or more documents;
   extracting one or more conditions as a logical formula from each paragraph text in the one or more portions of the two or more documents comprising a condition expression;
   obtaining one or more condition sets written by a set of logical formulas from the one or more extracted conditions, according to a set of child nodes belonging to each of one or more common parent nodes in each of the one or more paragraph trees;
   generating a must-cover-condition set (MCCS) used for quality inspection for each of the one or more condition sets written by the set of logical formulas;

inserting one or more warning messages into the one or more portions of the two or more documents, responsive to a failure to satisfy one or more conditions of the MCCS used for quality inspection, the one or more conditions including missing, improperly described, inconsistently described, and extra conditions from the one or more conditions for the one or more portions of the two or more documents; and iteratively revising each portion of the two or more documents with the warning messages inserted to satisfy the failed conditions of the MCCS used for quality inspection until the conditions of the MCCS are satisfied for the two or more documents.

19. The computer program product according to claim 18, wherein the program instructions executable by a computer to cause the computer to perform a method for performing quality inspection on the one or more documents comprising:

judging whether or not a document in the two or more documents satisfies any one of the one or more condition sets used for quality inspection; and concluding, if the judgment is positive, that the judged document does not have any inconsistent description or, if the judgment is negative, that the judged document has any inconsistent description.

20. The computer program product according to claim 19, wherein the program instructions for performing quality inspection on the two or more documents further comprises reporting the judged document, if the judgment is negative.

* * * * *